United States Patent [19]
Yamasaki et al.

[11] Patent Number: 5,910,384
[45] Date of Patent: Jun. 8, 1999

[54] μ-OXO-GALLIUIM PHTHALOCYANINE DIMER HAVING NOVEL POLYMORPH AND ELECTROPHOTOGRAPHIC PHOTORECEPTOR PREPARED BY USING THE SAME

[75] Inventors: Yasuhiro Yamasaki; Kazuyoshi Kuroda; Kenji Takaki, all of Neyagawa, Japan

[73] Assignee: Orient Chemical Industries, Ltd., Osaka-Fu, Japan

[21] Appl. No.: 08/919,783

[22] Filed: Aug. 29, 1997

[30] Foreign Application Priority Data

Sep. 13, 1996 [JP] Japan .................................. 8-243381

[51] Int. Cl.$^6$ ....................................................... G03G 5/06
[52] U.S. Cl. ................................................ 430/58; 430/78
[58] Field of Search ................................... 430/58, 56, 78

[56] References Cited

U.S. PATENT DOCUMENTS

| | | | |
|---|---|---|---|
| 4,900,817 | 2/1990 | Batzel et al. | 257/40 |
| 5,495,011 | 2/1996 | Nukada et al. | 540/142 |
| 5,545,733 | 8/1996 | Daimon et al. | 540/139 |
| 5,643,703 | 7/1997 | Daimon et al. | 430/78 |
| 5,688,619 | 11/1997 | Hongo et al. | 430/78 |

FOREIGN PATENT DOCUMENTS

| | | |
|---|---|---|
| 0 679693 | 11/1995 | European Pat. Off. . |
| 0 790283 | 8/1997 | European Pat. Off. . |
| 2 255980 | 11/1992 | United Kingdom . |

*Primary Examiner*—John Goodrow
*Attorney, Agent, or Firm*—Birch, Stewart, Kolasch & Birch, LLP

[57] ABSTRACT

The present invention provides μ-oxo-gallium phthalocyanine dimer having a novel polymorph. The μ-oxo-gallium phthalocyanine dimer may be applied as a charge generator for an organic photoconductive material, such as a photoreceptor of practical use and a high-gamma photoreceptor. The resulting organic photoconductive material has good stability and good electronic properties. The μ-oxo-gallium phthalocyanine dimer having a novel polymorph which shows diffraction peaks at a Bragg angle (2 θ±0.2°) of 6.8°, 12.9°, 19.0°, 19.6°, 20.3°, 25.5°, 25.9° and 26.9° in an X-ray diffraction spectrum by CuK α-ray.

33 Claims, 16 Drawing Sheets

μ-OXO-GALLIUIM PHTHALOCYANINE DIMER HAVING NOVEL POLYMORPH AND ELECTROPHOTOGRAPHIC PHOTORECEPTOR PREPARED BY USING THE SAME

FIELD OF THE INVENTION

The present invention relates to μ-oxo-gallium phthalocyanine dimer having a novel polymorph and an electrophotographic photoreceptor prepared by using the same.

BACKGROUND OF THE INVENTION

An electrophotographic photoreceptor have been widely applied to an electrophotographic apparatus such as a copying machine, a printer and the like. An inorganic photoconductor having photosensitivity in a visible region, for example amorphous selenium, has been heretofore used as the electrophotographic photoreceptor.

However, the inorganic photoconductor has disadvantage that it contains harmful selenium and cadmium sulfide, and costs for scrapping it become high. Further, the inorganic photoconductor is generally prepared by a vapor deposition method, and costs for producing it become high. The high production cost may also become disadvantage when it is applied to a low-priced machine.

An organic photoconductive substance which is sensitive to semi-conductor laser ray (about 800 nm), has been therefore a matter of interest in the art. A lot of organic photoconductive materials using such an organic photoconductive substance as an active component, have also been proposed. Examples thereof include a negative charging-form organic photoconductor (OPC) which contains a squarylium compound, an azulenium compound, and a phthalocyanine compound as a charge generator. This type of OPC has a conductive substrate, and a photoconductive layer formed thereon. The photoconductive layer comprises a charge generator and a charge transporting material. The OPC is generally classified as those of mono-layered construction and of bi-layered construction.

The conventional OPC, however, does not have sufficient electronic properties such as chargeability, dark decay, and residual potential, and does not have sufficient durability, when it is charged and irradiated repeatedly in the practical use.

Thus, it is desired an organic photoconductive compound which has high sensitivity to visible light or longer-wavelength light, and high durability, when it is used as a charge generator of a charge generating layer (CGL), particularly those of the function separated-form OPC which has bi-layered (CGL and charge transporting layer (CTL)) construction.

Phthalocyanine (This is hereinafter referred to as "Pc".) shows wide variety of electronic properties depending on a kind of the central metal atom bonded thereto, on a kind of the peripheral substituent, and on a kind of preparing process or treating process. It is also known to the art that even if the chemical structure of Pc is equal, when stacking state of the molecules of Pc is different, electronic properties thereof may vary widely.

The stacking state of an organic compound is determined by a polymorph of the compound. That is, the polymorph of the compound determines an electronic state, particularly a perturbation of π electron of the compound. Therefore, the polymorph of the compound is an important factor for improving electronic properties of an organic photoconductive material.

Some Pcs such as titanyl Pc, vanadyl Pc, and X-form metal-free Pc are actually applied to an electrophotographic photoreceptor. Japanese Patent Kokai Publication 98181/1993, 194523/1993, 247361/1993, 11873/1994, and 73303/1994, for example, describe chlorogallium Pc. Japanese Patent Kokai Publication 249716/1993, 263007/1993, and 279591/1993 describe hydroxy gallium Pc having a novel polymorph.

However, photosensitivity and durability of such a conventional OPC are insufficient. There is therefore a need for a novel polymorph of Pc, which may provide an electrophotographic photoreceptor having good photosensitivity and good durability.

SUMMARY OF THE INVENTION

The present invention provides μ-oxo-gallium phthalocyanine dimer having a novel polymorph. The μ-oxo-gallium phthalocyanine dimer may be applied to as a charge generator for an organic photoconductive material, such as a high-gamma photoreceptor. The resulting organic photoconductive material has good stability and good electronic properties, that is, it has good chargeability, small dark decay, and small residual potential.

The present invention provides the following μ-oxogallium phthalocyanine dimers having a novel polymorph, as well as the process for producing the μ-oxo-gallium phthalocyanine dimers:

(1) μ-Oxo-gallium phthalocyanine dimer having a novel polymorph which shows diffraction peaks at a Bragg angle (2 θ±0.2°) of 6.8°, 12.9°, 19.0°, 19.6°, 20.3°, 25.5°, 25.9°, and 26.9° in an X-ray diffraction spectrum by CuK α-ray (This is hereinafter referred to as "A-form dimer".);

(2) μ-Oxo-gallium phthalocyanine dimer having a novel polymorph which shows diffraction peaks at a Bragg angle (2 θ±0.2°) of 7.1° in an X-ray diffraction spectrum by CuK α-ray, and shows no clear peak other than 7.1° (This is hereinafter referred to as "Amorphous-form dimer".);

(3) μ-Oxo-gallium phthalocyanine dimer having a novel polymorph which shows diffraction peaks at a Bragg angle (2 θ±0.2°) of 8.1°, 8.7°, 9.2°, 10.4°, 15.1°, 15.9°, 17.0°, 21.7°, 22.3°, 22.9°, 24.3°, 28.8°, 29.4°, and 30.5° in an X-ray diffraction spectrum by CuK α-ray (This is hereinafter referred to as "B-form dimer".);

(4) μ-Oxo-gallium phthalocyanine dimer having a novel polymorph which shows diffraction peaks at a Bragg angle (2 θ±0.2°) of 7.7°, 16.0°, 24.9°, and 26.3° in an X-ray diffraction spectrum by CuK α-ray (This is hereinafter referred to as "C-form dimer");

(5) μ-Oxo-gallium phthalocyanine dimer having a novel polymorph which shows diffraction peaks at a Bragg angle (2 θ±0.2°) of 7.3°, 8.8°, 22.6°, 25.5°, and 27.8° in an X-ray diffraction spectrum by CuK α-ray (This is hereinafter referred to as "D-form dimer".);

(6) μ-Oxo-gallium phthalocyanine dimer having a novel polymorph which shows diffraction peaks at a Bragg angle (2 θ±0.2°) of 7.7°, 16.3°, 24.2°, and 27.6° in an X-ray diffraction spectrum by CuK α-ray (This is hereinafter referred to as "E-form dimer".);

(7) μ-Oxo-gallium phthalocyanine dimer having a novel polymorph which shows diffraction peaks at a Bragg angle (2 θ±0.2°) of 7.7°, 8.2°, 11.1°, 12.4°, 13.3°, 15.3°, 18.5°, 18.8°, 22.1°, 22.5°, 25.5°, 27.0°, 28.7°, 29.1°, and 29.4° in an X-ray diffraction spectrum by CuK α-ray (This is hereinafter referred to as "F-form dimer".);

(8) μ-Oxo-gallium phthalocyanine dimer having a novel polymorph which shows diffraction peaks at a Bragg angle (2 θ±0.2°) of 7.4°, 9.9°, 12.5°, 12.9°, 16.1°, 18.5°, 21.9°, 22.2°, 24.0°, 25.1°, 25.8°, and 28.2° in an X-ray diffraction spectrum by CuK α-ray (This is hereinafter referred to as "G-form dimer".);

(9) μ-Oxo-gallium phthalocyanine dimer having a novel polymorph which shows diffraction peaks at a Bragg angle (2 θ±0.2°) of 7.6°, 16.4°, 25.1°, and 26.6° in an X-ray diffraction spectrum by CuK α-ray (This is hereinafter referred to as "H-form dimer".); and

(10) μ-Oxo-gallium phthalocyanine dimer having a novel polymorph which shows diffraction peaks at a Bragg angle (2 θ±0.2°) of 6.5°, 13.1°, 19.0°, 19.7°, 25.4°, and 26.3° in an X-ray diffraction spectrum by CuK α-ray (This is hereinafter referred to as "I-form dimer".).

The present invention also provides an electrophotographic photoreceptor prepared by using any one of the the μ-oxo-gallium phthalocyanine dimer.

DETAILED DESCRIPTION OF THE INVENTION

Figure 1:
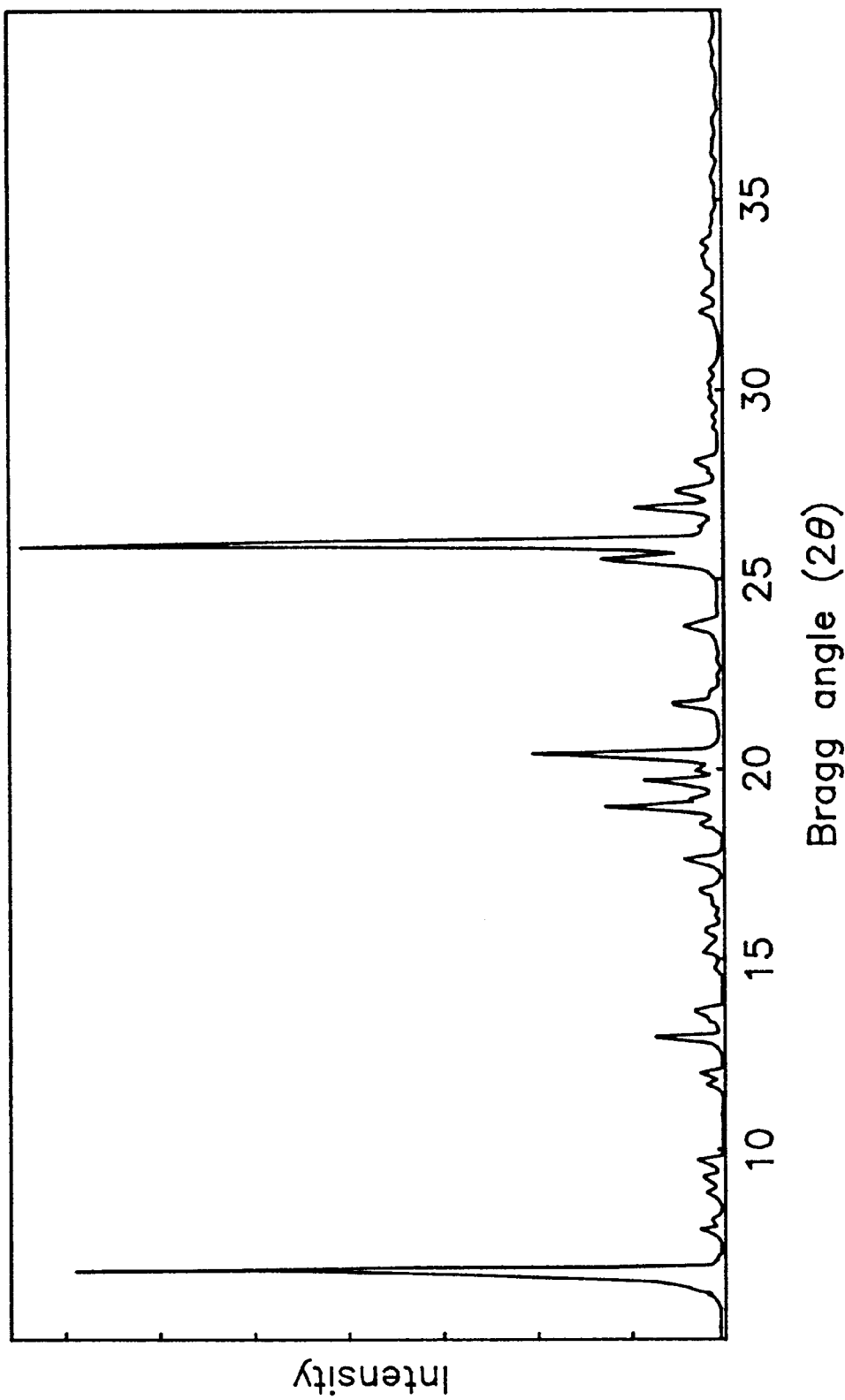
FIG. 1 is an X-ray diffraction spectrum of A-form dimer, which is prepared in Example 1.

μ-Oxo-gallium phthalocyanine dimer is a compound which has the following chemical structure.

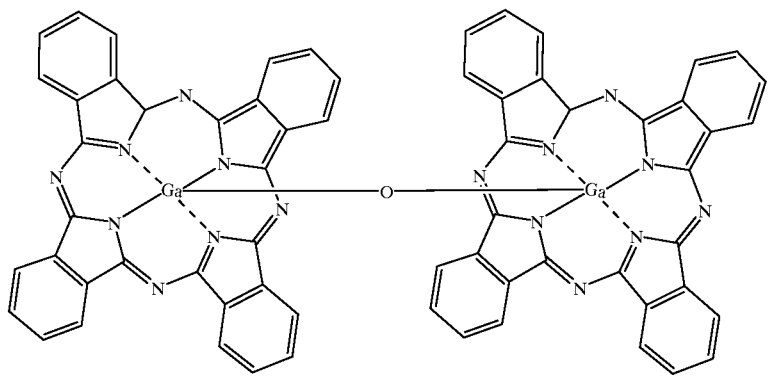

The μ-Oxo-gallium phthalocyanine dimer is prepared by, for example the process described below.

Phthalonitrile or 1,3-diiminoisoindoline is reacted with gallium chloride in a high boiling point organic solvent such as 1-chloronaphthalene or quinoline to obtain chlorogallium phthalocyanine. The crude chlorogallium Pc is then purified by hot filtering, and washing with hot DMF and DMF.

The resulting chlorogallium Pc is hydrolyzed in an acidic or an alkaline solution, or is acid pasted by using concentrated sulfuric acid to obtain hydroxygallium Pc. The process of hydrolysis is known to the art and described in Japanese Patent Kokai Publications No. 221459/1989, and 279591/1993, for example.

The wording "acid pasting by using concentrated sulfuric acid" means a process for finely dividing or purifying a pigment to give an amorphous stage. That is, the pigment is dissolved in concentrated sulfuric acid, preferably sulfuric acid having a concentration of not less than 90%, and the resulting solution is poured in ice water.

The resulting hydroxygallium Pc is heated and dehydrolized in a water-immiscible organic solvent having high boiling point to obtain μ-oxo-gallium Pc dimer. The hydroxygallium Pc is, for example, stirred and refluxed in o-dichlorobenzene; generated water is removed from reaction system; the reaction product is filtered; washed with DMF; with methanol; and dried and ground.

However, the μ-oxo-gallium Pc dimer in the present invention is prepared according to the following manner.

That is, chlorogallium Pc is acid pasted with concentrated sulfuric acid, and then, the resulting blue solid is heated and dehydrated in o-dichlorobenzene.

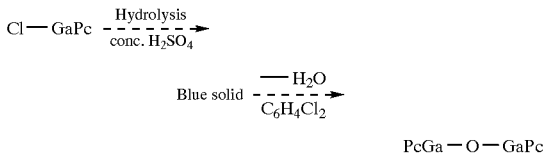

A-form dimer is prepared according to the above procedure. A specific polymorph of the A-form dimer is novel.

The A-form dimer is dry milled to obtain Amorphous-form dimer.

The wording "dry mill" or "dry milling" of the present specification means the procedure in which a solid substance is milled by using no solvent. The wording "mill" or "milling" means the procedure in which a solid substance is finely divided with mechanical force. The mill or milling is generally conducted on a dispersing machine such as a ball mill, a sand mill, a paint shaker, an attritor, and an automatic mortar, by using optionally a mill medium such as glass beads, steel beads, and alumina beads.

The dry milling is continued until change of polymorph does not progress. It is conducted generally at room temperature for 20 to 100 hours, preferably 48 to 72 hours. If the dry milling is conducted less than 20 hours, formation of polymorph becomes insufficient, and even if the dry milling is conducted more than 100 hours, useful effect may not be obtained.

The dry milling is for example conducted by using a dispersing machine (a paint shaker for example), until polymorph of the $\mu$-oxo-gallium Pc dimer fixes.

When 7 g of sample was used in combination with 80 g of glass beads having 5 mm $\phi$, it generally takes 48 to 72 hours.

The other $\mu$-oxo-gallium Pc dimer which has a novel polymorph of the present invention can be obtained by using the Amorphous-form dimer. The Amorphous-form dimer is wet milled or simply dispersed in the specific solvent at a raised or room temperature, to obtain the $\mu$-oxo-gallium Pc dimer which has the specific polymorph of the present invention.

The wording "wet mill" or "wet milling" of the present specification means the step in which a solid substance is milled by using a solvent. Wet milling is conducted in substantially the same manner as the dry milling, except using a solvent. Thus, a mill medium such as glass beads, steel beads, and alumina beads may be employed in the wet milling. The wording "simply disperse" or "simply dispersing" means the step in which a solid substance is dispersed with stirring into a solvent.

A solvent employed in the present invention is not particularly limited, unless it solves $\mu$-oxo-gallium phthalocyanine dimer. The solvent is selected, depending on a kind of the polymorph which is desired. It is generally selected from the group consisting of a ketone solvent, an alcohol solvent, a glycol solvent, a formamide solvent, an amide solvent, an ether solvent, and an aromatic solvent.

Examples of the ketone solvent include linear or cyclic ketones such as cyclohexanone, diisopropyl ketone, methyl ethyl ketone (MEK), methyl isobutyl ketone (MIBK). Examples of the alcohol solvent include monohydric lower alcohols such as methanol, ethanol, propanol, isopropanol, amyl alcohol, hexyl alcohol, and octyl alcohol. Examples of the glycol solvent include alkylene glycols such as ethylene glycol, diethylene glycol, triethylene glycol, and propylene glycol; alkylene glycol monoalkyl ethers such as ethylene glycol monomethyl ether (Methyl cellosolve), ethylene glycol monoethyl ether (Ethyl cellosolve), and propylene glycol monomethyl ether; ethylene glycol dialkyl ethers such as monoglyme, diglyme, triglyme, and tetraglyme. Examples of the formamide solvent include dimethylformamide (DMF), dimethylacetamide, and N-methyl pyrrolidone. Examples of the ether solvent include linear or cyclic ethers such as tetrahydrofuran (THF), dioxane, ethyl ether, and butyl ether. Examples of the acetate solvent include ethyl acetate, and butyl acetate. Examples of the aromatic solvent include hydrocarbons such as toluene, o-xylene, and tetralin, and hydrocarbons having high boiling point such as o-dichlorobenzene, chloronaphthalene, bromonaphthalene, and quinoline.

Examples of the solvent used for producing B-form dimer of the present invention include the glycol solvent, preferably ethylene glycol, diethylene glycol, and triethylene glycol, more preferably ethylene glycol.

Examples of the solvent used for producing C-form dimer of the present invention include the ketone solvent, preferably cyclohexanone, diisopropyl ketone, more preferably cyclohexanone.

Examples of the solvent used for producing D-form dimer of the present invention include the alcohol solvent having not less than 5 carbon atoms, preferably amyl alcohol, hexyl alcohol, and octyl alcohol, more preferably amyl alcohol.

Examples of the solvent used for producing E-form dimer of the present invention include the (poly)ethylene glycol dialkyl ethers, preferably diglyme, triglyme, and tetraglyme, more preferably diglyme.

Examples of the solvent used for producing F-form dimer of the present invention include the alkylene glycol monoalkyl ethers, preferably ethylene glycol monomethyl ether, ethylene glycol monoethyl ether, and propylene glycol monomethyl ether, more preferably ethylene glycol monomethyl ether.

Examples of the solvent used for producing G-form dimer of the present invention include DMF, toluene, ethyl acetate, and triglyme, more preferably the amide solvent such as DMF.

Examples of the solvent used for producing H-form dimer of the present invention include the lower ketone solvent having 3 to 10 carbon atoms such as cyclohexanone, and methyl ethyl ketone; the lower alcohol solvent having not more than 4 carbon atoms such as methyl alcohol, and ethyl alcohol; N-methyl-2-pyrrolidone; preferably the lower ketone solvent and the lower alcohol solvent.

The solvent is partially equal to those for producing C-, or D-form dimer. In fact, C- or D-form dimer is obtained when Amorphous-form dimer is milled or dispersed at high temperature, and H-form dimer is obtained when Amorphous-form dimer is milled or dispersed at low temperature, as specifically described below.

Examples of the solvent used for producing I-form dimer of the present invention include the hydrocarbons having high boiling point, preferably o-dichlorobenzene, chloronaphthalene, bromonaphthalene, and quinoline, more preferably 1-chloronaphthalene.

The wet milling or simply dispersing is continued by using the above described specific solvent until polymorph of the μ-oxo-gallium Pc dimer fixes. It takes generally for 5 to 50 hours, preferably 10 to 20 hours at from room temperature up to reflux temperature of the solvent. If the step is conducted less than 5 hours, formation of the polymorph becomes insufficient, and even if the step is conducted more than 50 hours, useful effect may not be obtained.

When ethylene glycol is used as the solvent, Amorphous-form dimer is wet milled at room temperature for about 16 hours to obtain B-form dimer of the present invention.

When cyclohexanone is used as the solvent, Amorphous-form dimer is simply dispersed with refluxing for about 30 to 40 hours to obtain C-form dimer of the present invention.

When amyl alcohol is used as the solvent, Amorphous-form dimer is simply dispersed with refluxing for about 10 hours to obtain D-form dimer of the present invention.

When diglyme is used as the solvent, Amorphous-form dimer is simply dispersed with refluxing for about 24 hours to obtain E-form dimer of the present invention.

When ethylene glycol monomethyl ether is used as the solvent, Amorphous-form dimer is simply dispersed with refluxing for about 13 hours to obtain F-form dimer of the present invention.

When DMF is used as the solvent, Amorphous-form dimer is simply dispersed at room temperature for about 10 to 12 hours to obtain G-form dimer of the present invention.

When cyclohxanone or lower alcohol is used as the solvent, Amorphous-form dimer is simply dispersed or is wet milled at room temperature for about 8 hours to obtain H-form dimer of the present invention.

When 1-chloronaphthalene is used as the solvent, Amorphous-form dimer is simply dispersed with refluxing for about 15 to 30 hours to obtain I-form dimer of the present invention.

μ-Oxo-gallium Pc dimer having a novel polymorph of the present invention is preferably employed as a photoconductive material for use in an electrophotographic photoreceptor which is widely applied to a copying machine using electrophotographic technology.

The photoconductive material comprising μ-oxo-gallium Pc dimer of the present invention as an effective ingredient provides good chargeability, high sensitivity, and high durability, when it is applied as a charge generating layer of an electrophotographic receptor.

The electrophotographic receptor generally has a conductive substrate, and a photoconductive layer formed thereon which comprises a charge generator and a charge transporting material. The photoconductive layer may be classified depending on its structure, i.e., a mono-layered one and a bi-layered one. μ-Oxo-gallium Pc dimer of the present invention may be employed in both the mono-layered photoconductive layer and the bi-layered photoconductive layer.

However, it is preferred that μ-oxo-gallium Pc dimer of the present invention is applied to the bi-layered photoconductive layer because each of the layers in the bi-layered photoconductive layer do not inhibit the respective functions, and they efficiently transfer the generated charge to a surface of the electrophotographic photoreceptor without trapping the charge, and therefore, electronic properties of the μ-oxo-gallium Pc dimer may sufficiently be exhibited. The electrophotographic photoreceptor which has bi-layered construction is generally called as a function separated-form photoreceptor.

The function separated-form photoreceptor is prepared by, for example, forming a charge generating layer on a conductive substrate, and forming a charge transporting layer thereon. Examples of the conductive substrate include metal (e.g., aluminium, nickel), metal vapor-deposited film and the like, in the form of a drum, a sheet or a belt.

μ-Oxo-gallium Pc dimer of the present invention may be included as a charge generator in the charge generating layer. The charge generating layer is formed as a thin layer on the conductive substrate. It can be formed by vapor-depositing the μ-oxo-gallium Pc dimer, but is generally formed by applying a binder resin dispersion of the μ-oxo-gallium Pc dimer. The binder resin dispersion may be prepared by dispersing the μ-oxo-gallium Pc dimer into a solution of a suitable binder resin, using a usual dispersing apparatus such as a ball mill, a sand mill, a paint shaker and the like.

A process for coating the binder resin dispersion is not specifically limited, and suitably include bar coating, dip coating, spin coating, roller coating, calendar coating and the like. The coated layer may be dried at a temperature of 30 to 200° C. for 5 minutes to 2 hours in the presence or absence of blast.

A solvent optionally be employed for preparing the dispersion. The solvent employed in the present invention is not particularly limited unless it solves μ-oxo-gallium Pc dimer. However, a solvent which may disperse μ-oxo-gallium Pc dimer uniformly and may solve the binder resin, is preferred. Examples thereof include alcohol solvents such as methanol, ethanol, isopropanol, and butanol; aromatic solvents such as toluene, xylene and tetralin; halogenated solvents such as dichloromethane, chloroform, trichloroethylene and carbon tetrachloride; ester solvents such as ethyl acetate and propyl acetate; ether solvents such as ethylene glycol monoethyl ether, dioxane and tetrahydrofuran; dimethylformamide and dimethyl sulfoxide.

The binder resin can be selected from a wide range of insulating resins. Examples of the preferred resin include condensation resins such as polycarbonate, polyester, polyamide, and polyallylate; addition polymers such as polystyrene, polyacrylate, styrene-acrylic copolymer, polyacrylamide, polymethacrylate, polyvinyl butyral, polyvinyl alcohol, polyacrylonitrile, polyacrylic-butadiene copolymer, polyvinyl chloride and vinyl chloride-vinyl acetate copolymer; organic photoconductive resins such as poly-N-vinyl carbazole and polyvinylanthracene; polysulfone, polyether sulfone, silicone resin, epoxy resin and urethane resin. These are used alone or in combination thereof.

The binder resin is employed in an amount of from 0.1 to 3.0 ratio by weight, preferably 0.5 to 2.0 by weight based on the charge generator. When the amount is more than 3.0, the amount of charge decreases, and sensitivity of the photoconductive layer becomes poor. The charge generating layer is preferably formed in a thickness of from 0.05 to 5.0 μm, preferably 0.1 to 3.0 μm. When the thickness is more than 5.0 μm, charge may readily be trapped, and sensitivity of the photoconductive layer becomes poor.

A charge transporting layer containing a charge transporting material is then formed on the charge generating layer. This layer may be formed in the same manner as described above, for forming the charge generating layer. That is, the charge transporting material is dissolved in a solvent with a binder resin, and the resulting solution is uniformly applied on the charge generating layer, followed by drying.

Examples of the charge transporting material include conventional materials such as an oxadiazole derivative, a pyrazoline derivative, a hydrazone derivative, a triazine derivative, a quinazoline derivative, a triarylamine compound, a styryltriphenylamine compound, a butadiene compound, and a carbazole compound.

Examples of the binder resin and solvent include the same materials as that employed for the charge generating layer.

The binder resin is employed in an amount of from 0.1 to 5.0 ratio by weight, preferably 0.5 to 2.0 ratio by weight based on the charge transporting material. When the amount is more than 5.0, concentration of the charge transporting material in the charge transporting layer becomes small, and sensitivity of the photoconductive layer becomes poor. The charge transporting layer is preferably formed in a thickness of from 5 to 50 μm, preferably 10 to 40 μm. When the thickness is more than 50 μm, long time is required for transporting the charge, and the charge may readily be trapped, and thereby sensitivity of the photoconductive layer becomes poor.

EXAMPLES

The following Examples and Comparative Examples further illustrate the present invention in detail but are not to be construed to limit the scope thereof.

The X-ray diffraction spectrum by CuK α-ray was measured by using the automatic X-ray diffraction system "MXP3" manufactured by Max Science Co. Ltd.

Synthesis Example 1
Synthesis of chlorogallium Pc 177.2 g of phthalonitrile, 820 ml of 1-chloronaphthalene, and 50.0 g of gallium chloride were charged in a 1000 ml glass four-necked flask equipped with requisite apparatuses such as a stirrer, a calcium chloride tube and the like, and the mixture was refluxed with stirring for 10 hours. Heating was then stopped and the mixture was cooled to about 200° C., and hot filtered and washed with 3500 ml of hot DMF, and 3000 ml of DMF.

Figure 12:
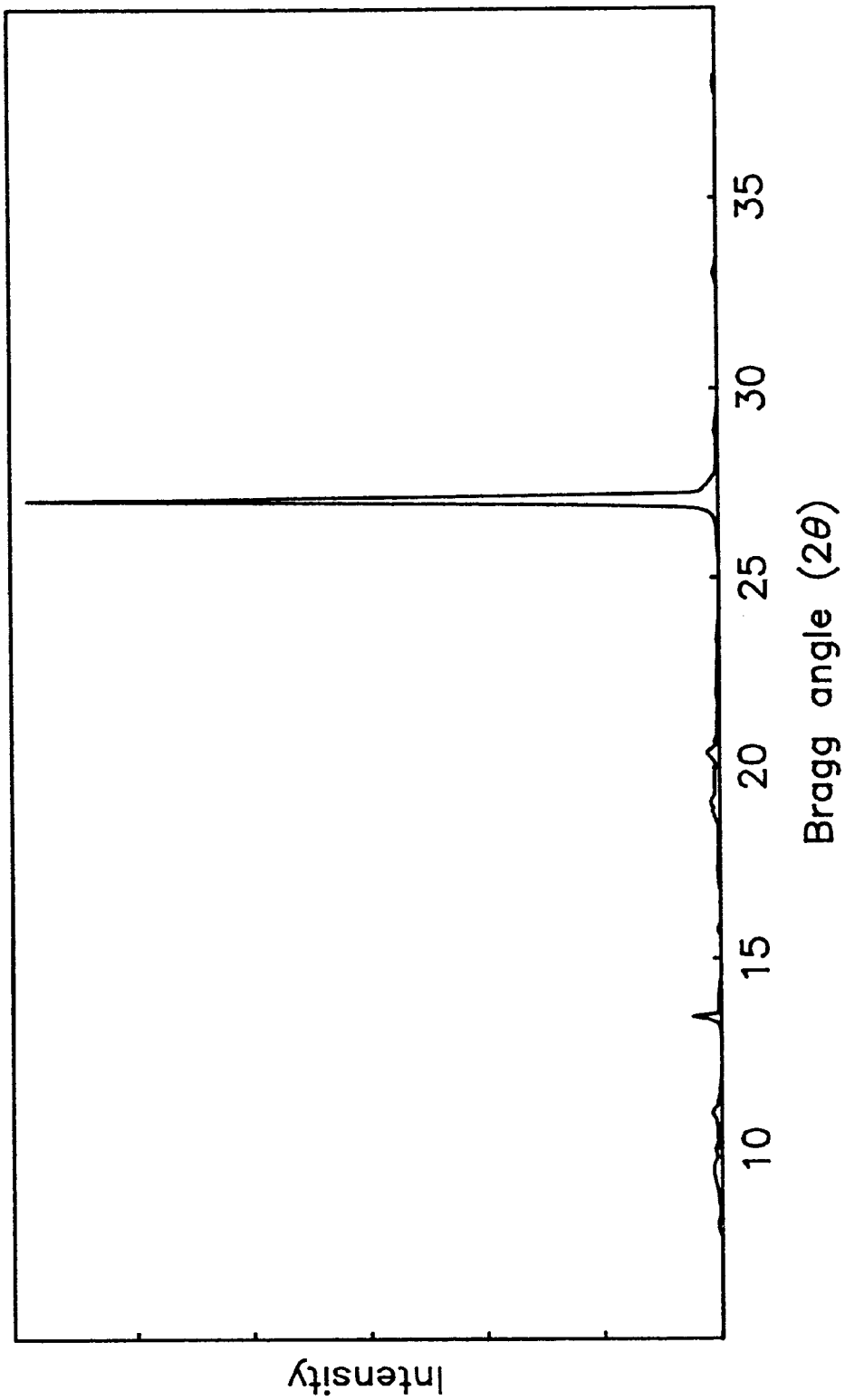
FIG. 12 is an X-ray diffraction spectrum of chlorogallium phthalocyanine, which is prepared in Synthesis Example 1.

The resulting wet cake was dispersed in 800 ml of DMF, and refluxed with stirring for 5 hours. The mixture was hot filtered, and washed again with 2500 ml of hot DMF and 2000 ml of DMF. The DMF was then replaced with methanol, and the product was dried to obtain 125.0 g of blue solid chlorogallium Pc (yield 73.5%). An X-ray diffraction spectrum of the product was shown in FIG. 12. The results of elemental analysis were shown in Table 1.

TABLE 1

|  | C | H | N | Cl | Ga |
|---|---|---|---|---|---|
| Calculated % | 62.22 | 2.61 | 18.14 | 5.74 | 11.29 |
| Found % | 62.23 | 2.52 | 18.02 | 6.04 | 10.39 |

Example 1
Synthesis of A-form dimer 10.0 g of chlorogallium Pc prepared in Synthesis Example 1 was slowly added to 300 g of sulfonic acid, with controlling a temperature thereof between 0 to 5° C., and the mixture was stirred for 1 hour. The mixture was then poured into 1500 ml of ice water with stirring and with controlling a temperature thereof not more than 5° C., and stirred for 2 hours. The resulting mixture was filtered and washed with water, and was dispersed in 1500 ml of ion exchanged water, and filtered again. The wet cake was washed with water, dispersed in 600 ml of 4% aqueous ammonia, and stirred with refluxing for 6 hours. The product was filtered again, and the resulting cake was thoroughly washed with water, dried under vacuum at 50° C., and ground to obtain 8.72 g of blue solid hydroxygallium Pc (yield 89.8%).

7.7 g of the hydroxygallium Pc was added to 130 ml of o-dichlorobenzene, and the mixture was stirred at a temperature between 170 to 180° C. The water which was generated was removed through Liebig condenser equipped beforehand. When generation of water stopped, the Liebig condenser was replaced with an air cooling condenser, the mixture was refluxed with stirring for 3 hours, and hot filtered. The cake was washed with DMF, and then with methanol in order to remove DMF. The product was dried, and ground to obtain 7.1 g of μ-oxo-gallium Pc dimer (yield 93.6%).

The μ-oxo-gallium Pc dimer had the polymorph which shows diffraction peaks at a Bragg angle (2 θ±0.2°) of 6.8°, 12.9°, 19.0°, 19.6°, 20.3°, 25.5°, 25.9°, and 26.9°, as shown in FIG. 1. Thus, it is A-form dimer.

Figure 11:
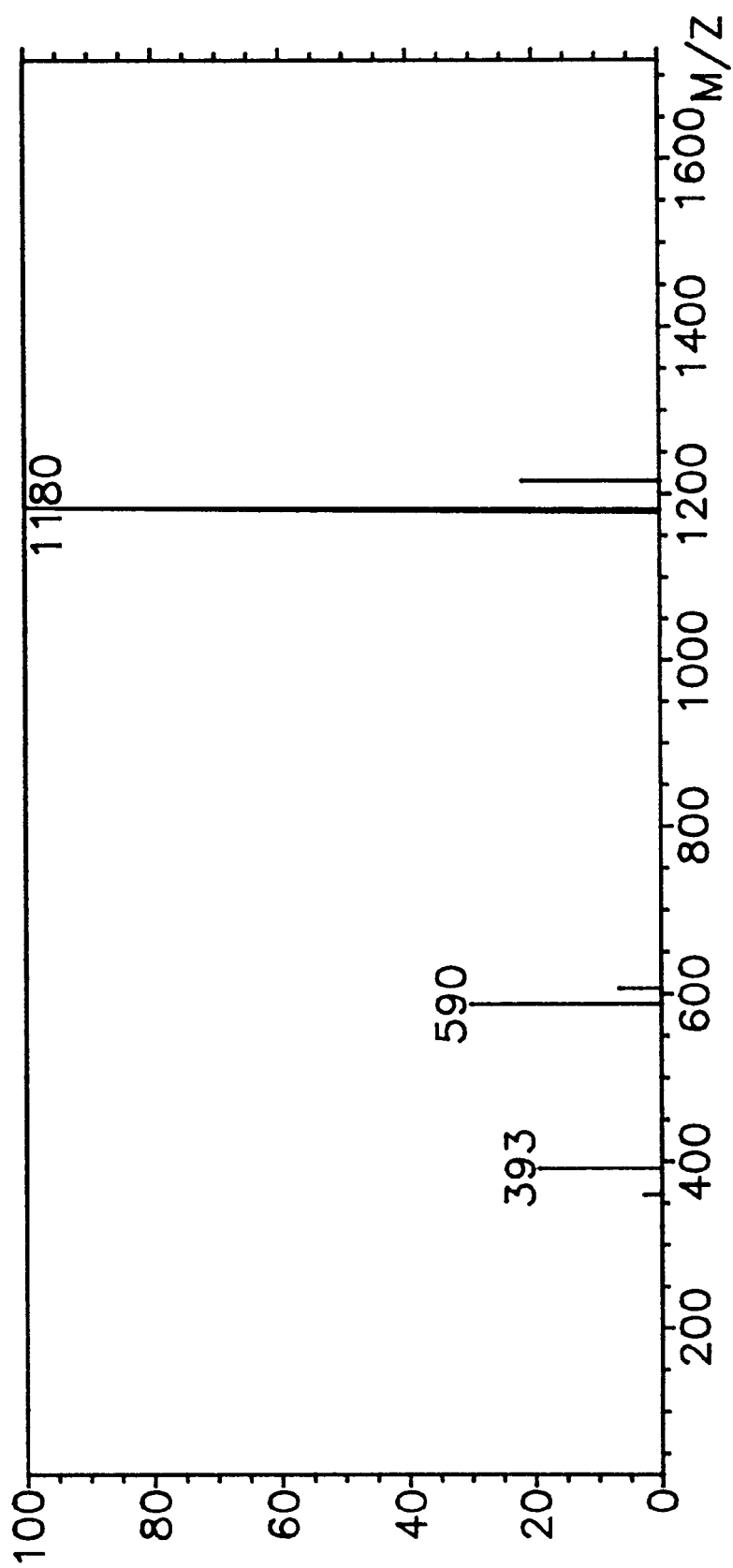
FIG. 11 is a FD-MS spectrum of μ-oxo-gallium phthalocyanine dimer of the present invention.
Figure 13:
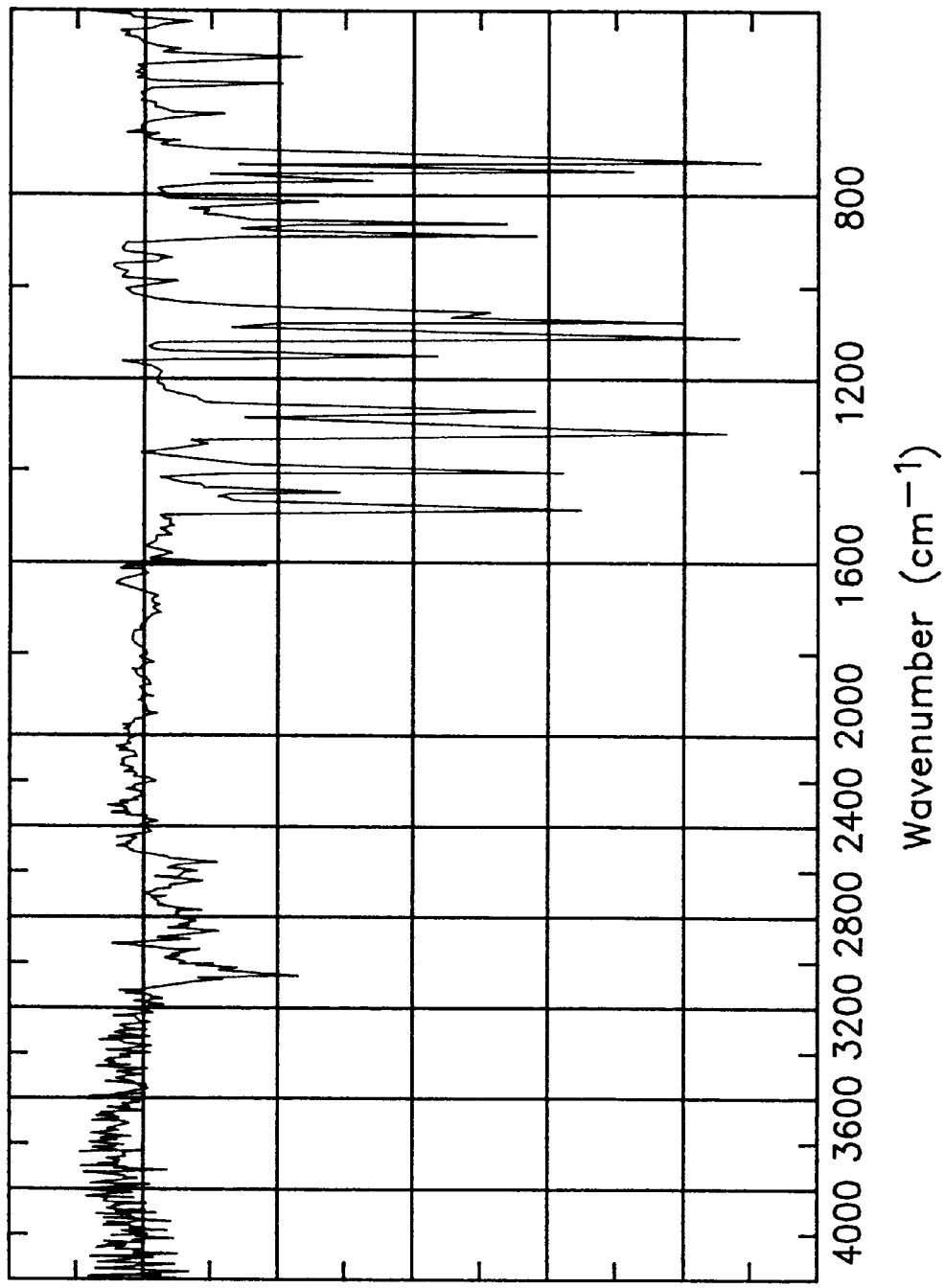
FIG. 13 is an infrared absorption spectrum of A-form dimer, which is prepared in Example 1.

An infrared absorption spectrum of the product was shown in FIG. 13. An FD-MS spectrum of the product was shown in FIG. 11. In FIG. 11, horizontal axis represents M/Z (ratio of mass to electric charge), and vertical axis represents relative abundance. A peak of μ-oxo-gallium Pc dimer is present at M/Z=1180 [M+H]$^+$ of the FD-MS spectrum.

Conditions for FD-MS analysis (Field Desorption-MS) is shown in Table 2.

TABLE 2

Apparatus: MS:JVS-DX303HF (manufactured by JEOL K.K.)

Conditions: FD method by using a carbon emitter

Resolution: 1500, or 500; 35 to 1700 M/Z

Accelerating voltage: 2.5 kV

Ion multiplier voltage: 1.6 to 1.8 kV

Emitter current: 0 to 40 mA

Cathode voltage: 5.0 kV

Solvent: DMF

The results of elemental analysis were shown in Table 3.

TABLE 3

|  | C | H | N | Cl | Ga |
|---|---|---|---|---|---|
| Calculated % | 65.12 | 2.73 | 18.98 | — | 11.81 |
| Found % | 65.07 | 2.64 | 18.80 | — | 10.75 |

Example 2
Synthesis of Amorphous-form dimer 7.0 g of A-form dimer prepared in Example 1, and 80 g of glass beads having a diameter of 5 mm φ were charged in a wide-mouthed bottle, and the mixture was dry milled for 2 to 3 days using a dispersing apparatus (paint shaker). The polymorph of the mixture was followed by sampling a part of the mixture. When the polymorph fixed, the glass beads were filtered out, and 6.8 g of blue solid μ-oxo-gallium Pc dimer was obtained.

Figure 2:
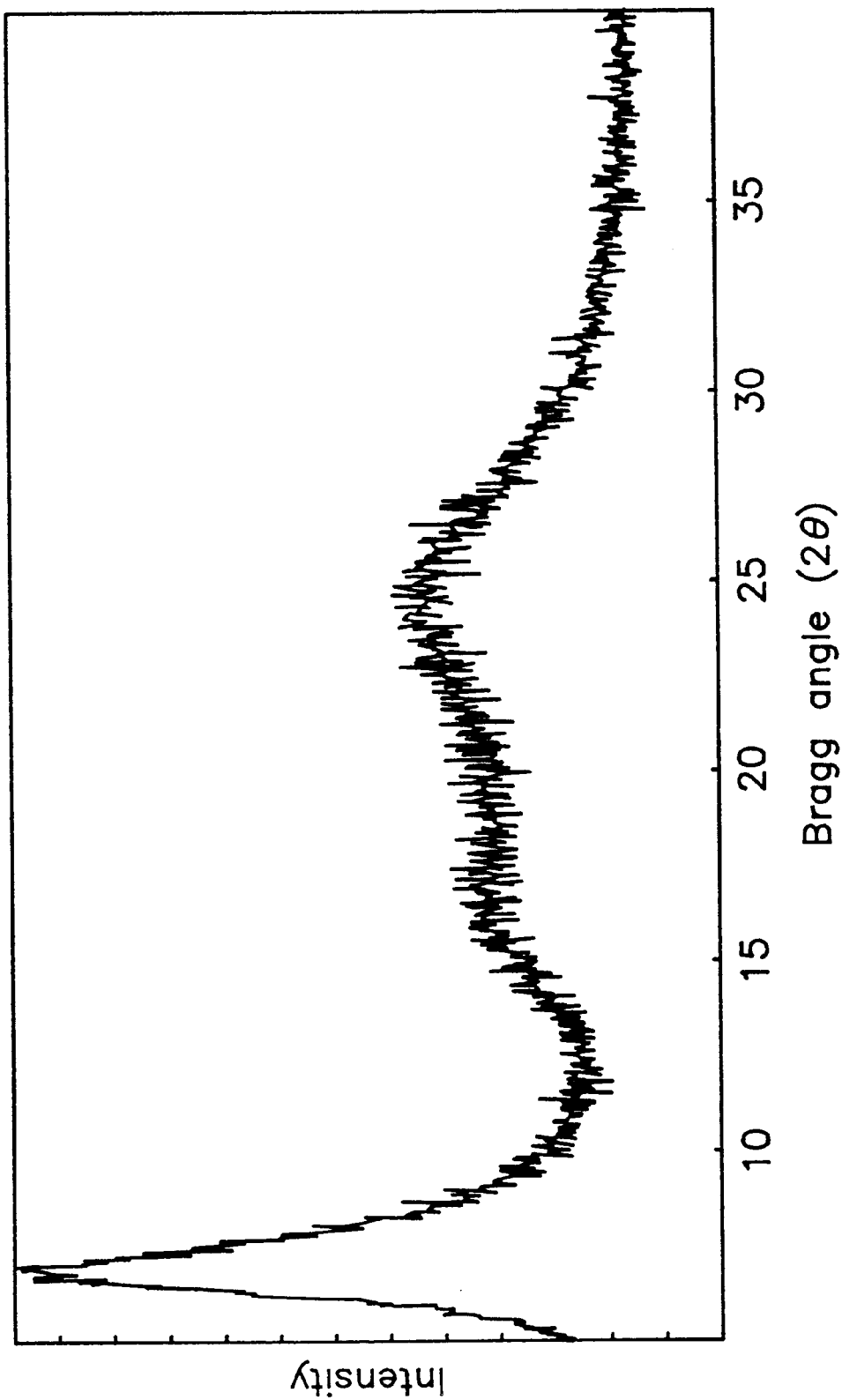
FIG. 2 is an X-ray diffraction spectrum of Amorphous-form dimer, which is prepared in Example 2.
Figure 14:
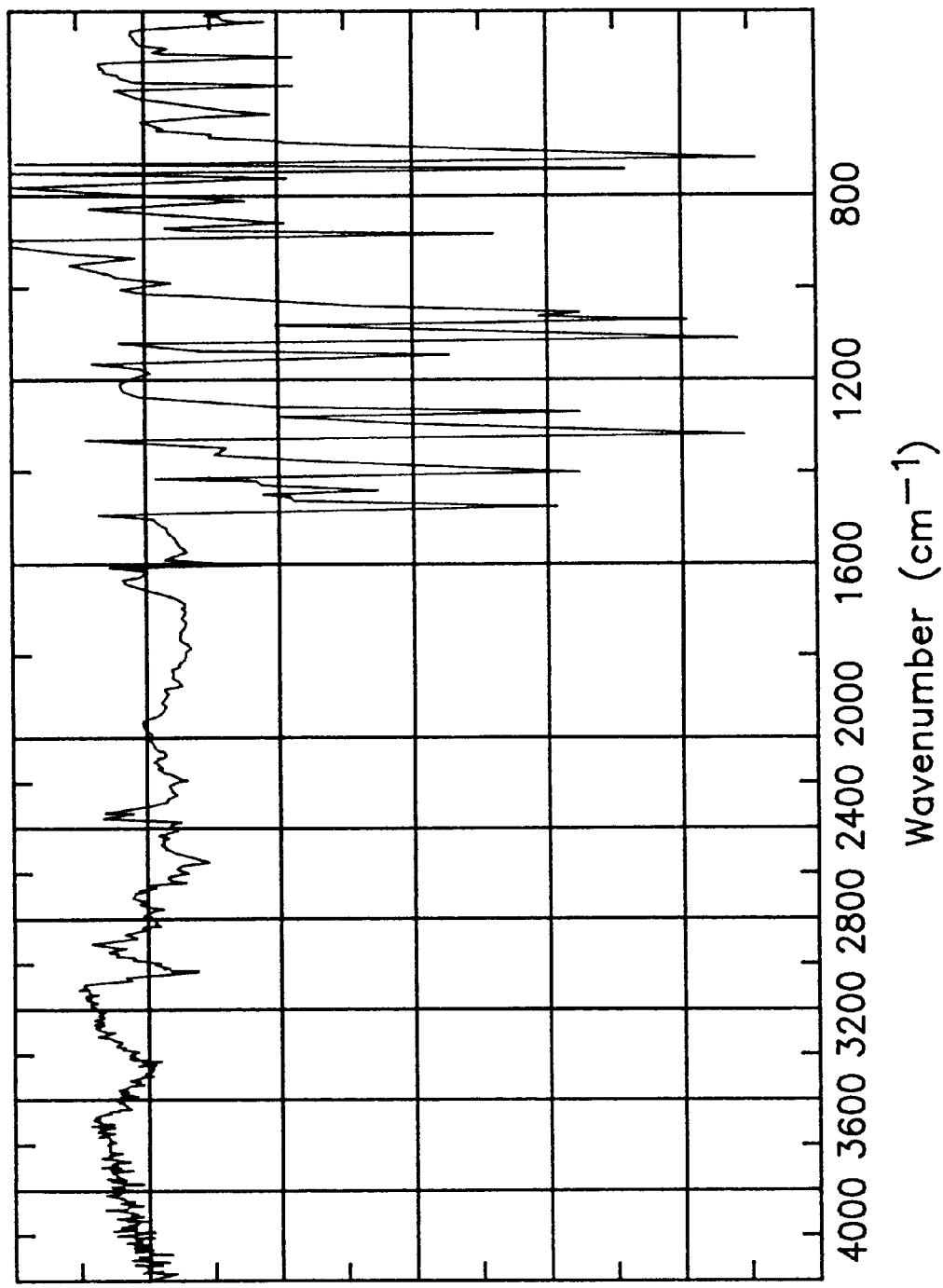
FIG. 14 is an infrared absorption spectrum of Amorphous-form dimer, which is prepared in Example 2.

An X-ray diffraction spectrum of the product was shown in FIG. 2, an infrared absorption spectrum was shown in FIG. 14, and the result of FD-MS analysis was shown in FIG. 11. Further, the results of elemental analysis were shown in Table 4.

TABLE 4

|  | C | H | N | Cl | Ga |
|---|---|---|---|---|---|
| Calculated % | 65.12 | 2.73 | 18.98 | — | 11.81 |
| Found % | 65.68 | 2.71 | 18.58 | — | 10.80 |

The above described results show that the product is $\mu$-oxo-gallium Pc dimer, and the X-ray diffraction spectrum indicates that the $\mu$-oxo-gallium Pc dimer is Amorphous-form dimer which shows diffraction peak at a Bragg angle (2 θ±0.2°) of 7.1°, and shows no clear peak other than 7.1°.

Example 3
Synthesis of B-form dimer 1.0 g of Amorphous-form dimer prepared in Example 2 was added to 30 ml of ethylene glycol, and the mixture was wet milled at room temperature for about 16 hours, by using paint shaker. The mixture was filtered. The resulting wet cake was washed with with DMF, and then with methanol in order to remove DMF. The product was dried under vacuum to obtain 0.96 g of blue solid $\mu$-oxo-gallium Pc dimer.

Figure 3:
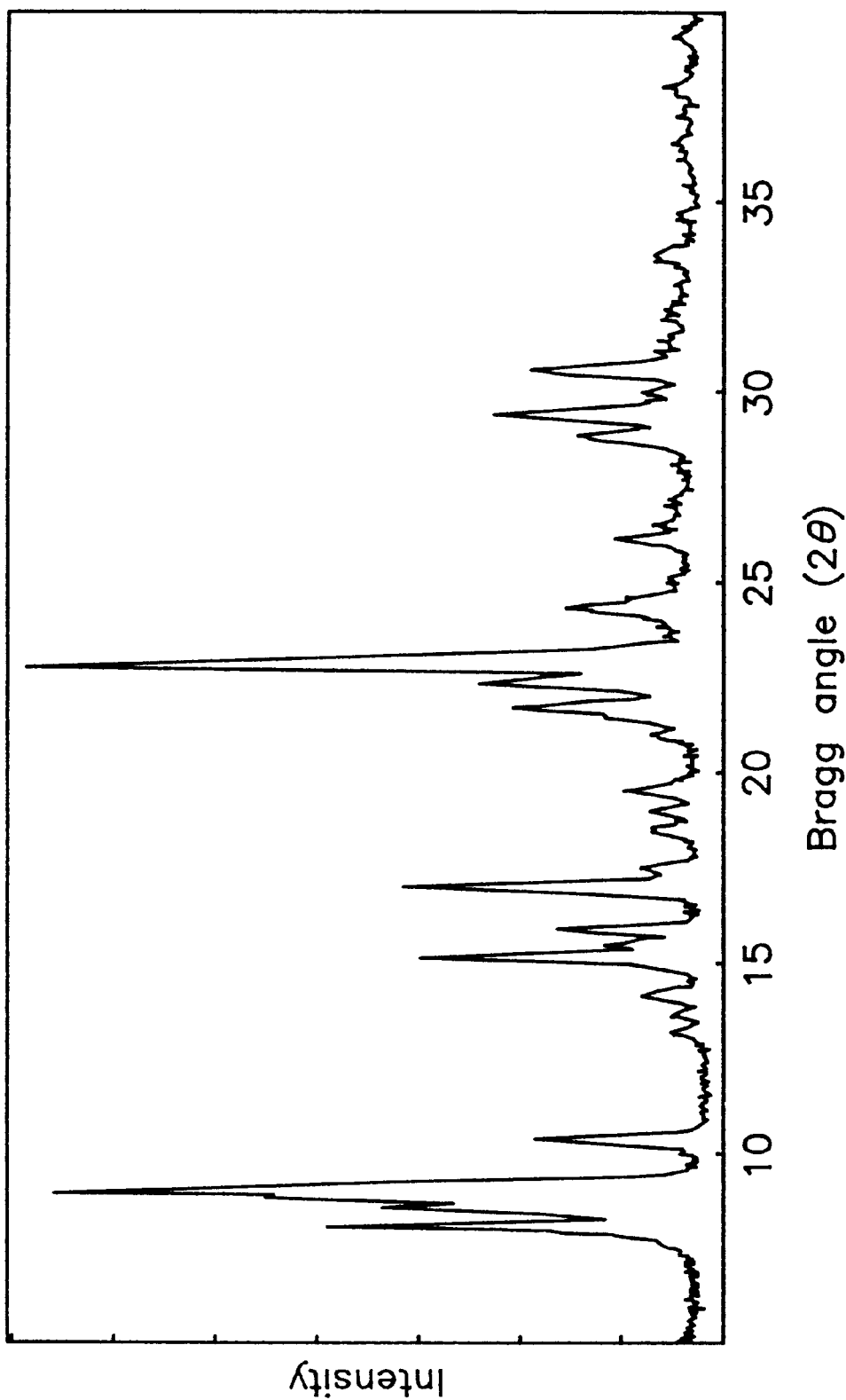
FIG. 3 is an X-ray diffraction spectrum of B-form dimer, which is prepared in Example 3.

An X-ray diffraction spectrum of the product was shown in FIG. 3. The result of FD-MS analysis was shown in FIG. 11. Further, the results of elemental analysis were shown in Table 5.

TABLE 5

|  | C | H | N | Cl | Ga |
|---|---|---|---|---|---|
| Calculated % | 65.12 | 2.73 | 18.98 | — | 11.81 |
| Found % | 65.90 | 3.54 | 16.90 | — | 9.89 |

The above described results show that the product is $\mu$-oxo-gallium Pc dimer, and the X-ray diffraction spectrum indicates that the $\mu$-oxo-gallium Pc dimer is B-form dimer which shows diffraction peaks at a Bragg angle (2 θ±0.2°) of 8.1°, 8.7°, 9.2°, 10.4°, 15.1°, 15.9°, 17.0°, 21.7°, 22.3°, 22.9°, 24.3°, 28.8°, 29.4°, and 30.5°.

Example 4
Synthesis of C-form dimer 1.0 g of Amorphous-form dimer prepared in Example 2 was added to 30 ml of cyclohexanone, and the mixture was refluxed with stirring (simply dispersed) for 30 to 40 hours. The mixture was allowed to cool, and filtered. The resulting wet cake was washed with methanol and dried under vacuum to obtain 0.61 g of blue solid $\mu$-oxo-gallium Pc dimer.

Figure 4:
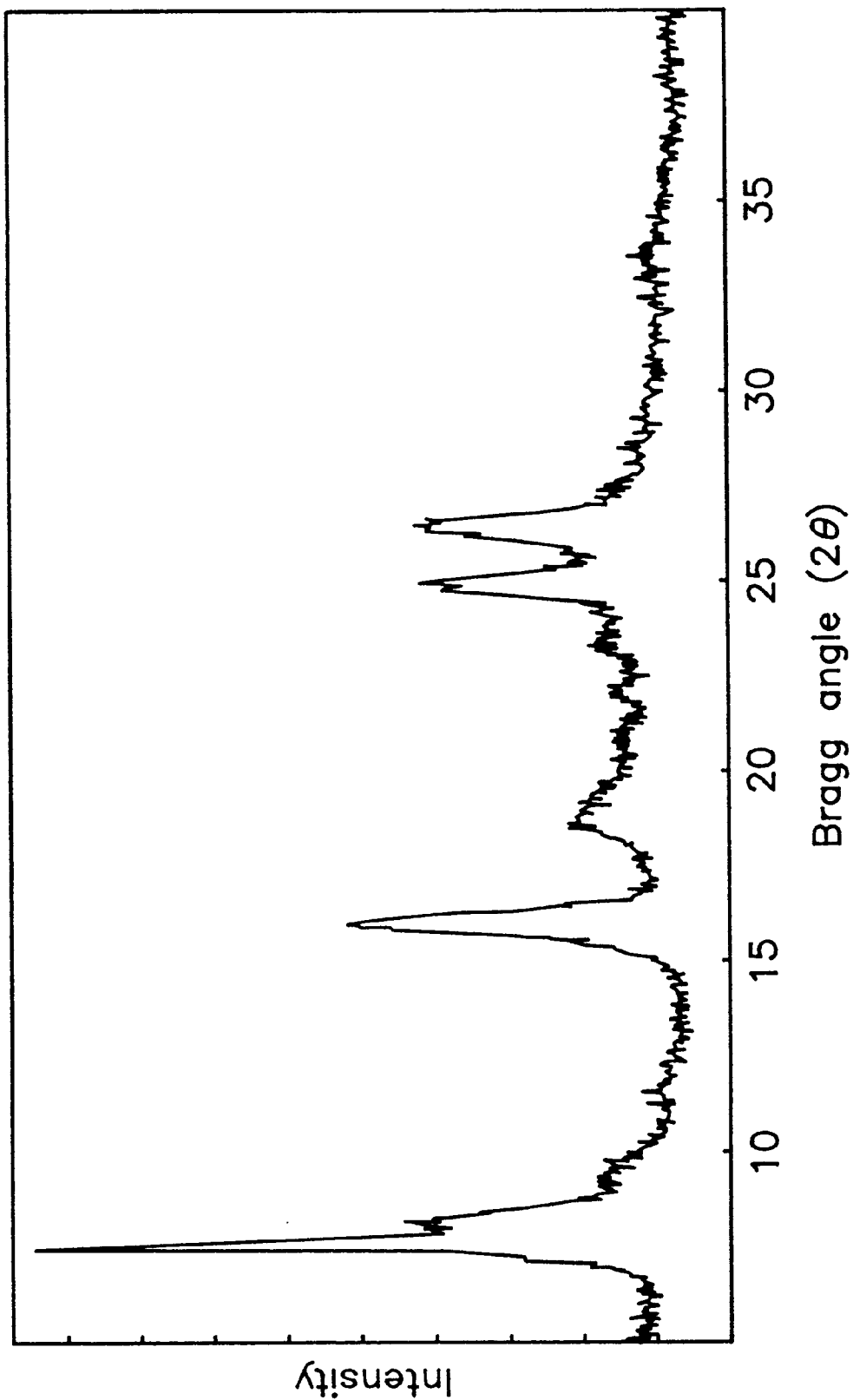
FIG. 4 is an X-ray diffraction spectrum of C-form dimer, which is prepared in Example 4.

An X-ray diffraction spectrum of the product was shown in FIG. 4. The result of FD-MS analysis was shown in FIG. 11. Further, the results of elemental analysis were shown in Table 6.

TABLE 6

|  | C | H | N | Cl | Ga |
|---|---|---|---|---|---|
| Calculated % | 65.12 | 2.73 | 18.98 | — | 11.81 |
| Found % | 65.72 | 3.48 | 14.97 | — | 10.64 |

The above described results show that the product is $\mu$-oxo-gallium Pc dimer, and the X-ray diffraction spectrum indicates that the $\mu$-oxo-gallium Pc dimer is C-form dimer which shows diffraction peaks at a Bragg angle (2 θ±0.2°) of 7.7°, 16.0°, 24.9°, and 26.3°.

Example 5
Synthesis of D-form dimer 1.0 g of Amorphous-form dimer prepared in Example 2 was added to 30 ml of amyl alcohol, and the mixture was refluxed with stirring (simply dispersed) for 10 hours. The mixture was allowed to cool, and filtered. The resulting wet cake was washed with methanol and dried under vacuum to obtain 0.91 g of blue solid $\mu$-oxo-gallium Pc dimer.

Figure 5:
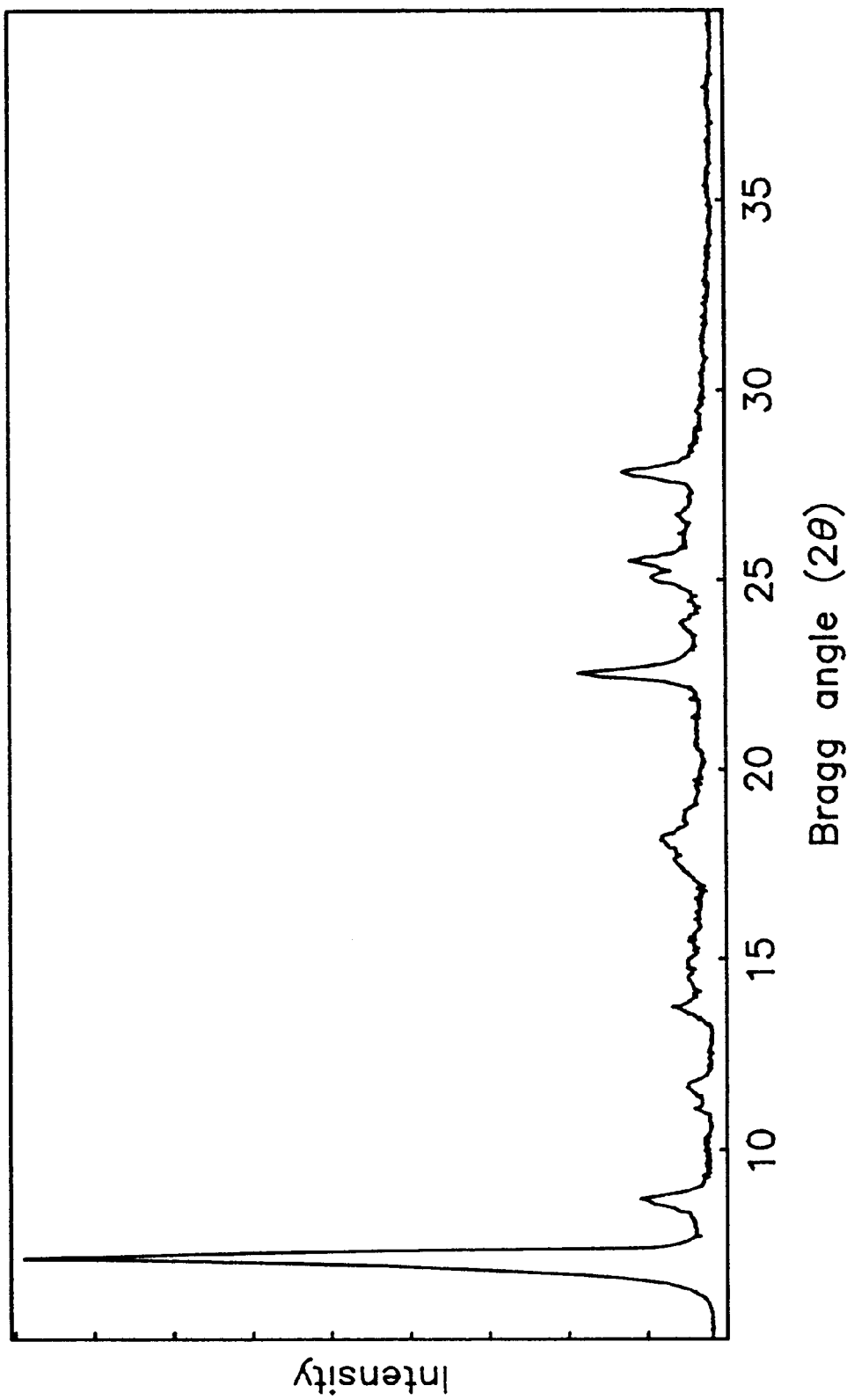
FIG. 5 is an X-ray diffraction spectrum of D-form dimer, which is prepared in Example 5.

An X-ray diffraction spectrum of the product was shown in FIG. 5. The result of FD-MS analysis was shown in FIG. 11. Further, the results of elemental analysis were shown in Table 7.

TABLE 7

|  | C | H | N | Cl | Ga |
|---|---|---|---|---|---|
| Calculated % | 65.12 | 2.73 | 18.98 | — | 11.81 |
| Found % | 66.15 | 4.03 | 16.97 | — | 9.90 |

The above described results show that the product is $\mu$-oxo-gallium Pc dimer, and the X-ray diffraction spectrum indicates that the $\mu$-oxo-gallium Pc dimer is D-form dimer which shows diffraction peaks at a Bragg angle (2 θ±0.2°) of 7.3°, 8.8°, 22.6°, 25.5°, and 27.8°

Example 6
Synthesis of E-form dimer 1.0 g of Amorphous-form dimer prepared in Example 2 was added to 30 ml of diglyme, and the mixture was refluxed with stirring (simply dispersed) for 24 hours. The mixture was allowed to cool, and filtered. The resulting wet cake was washed with methanol and dried under vacuum to obtain 0.60 g of blue solid $\mu$-oxo-gallium Pc dimer.

Figure 6:
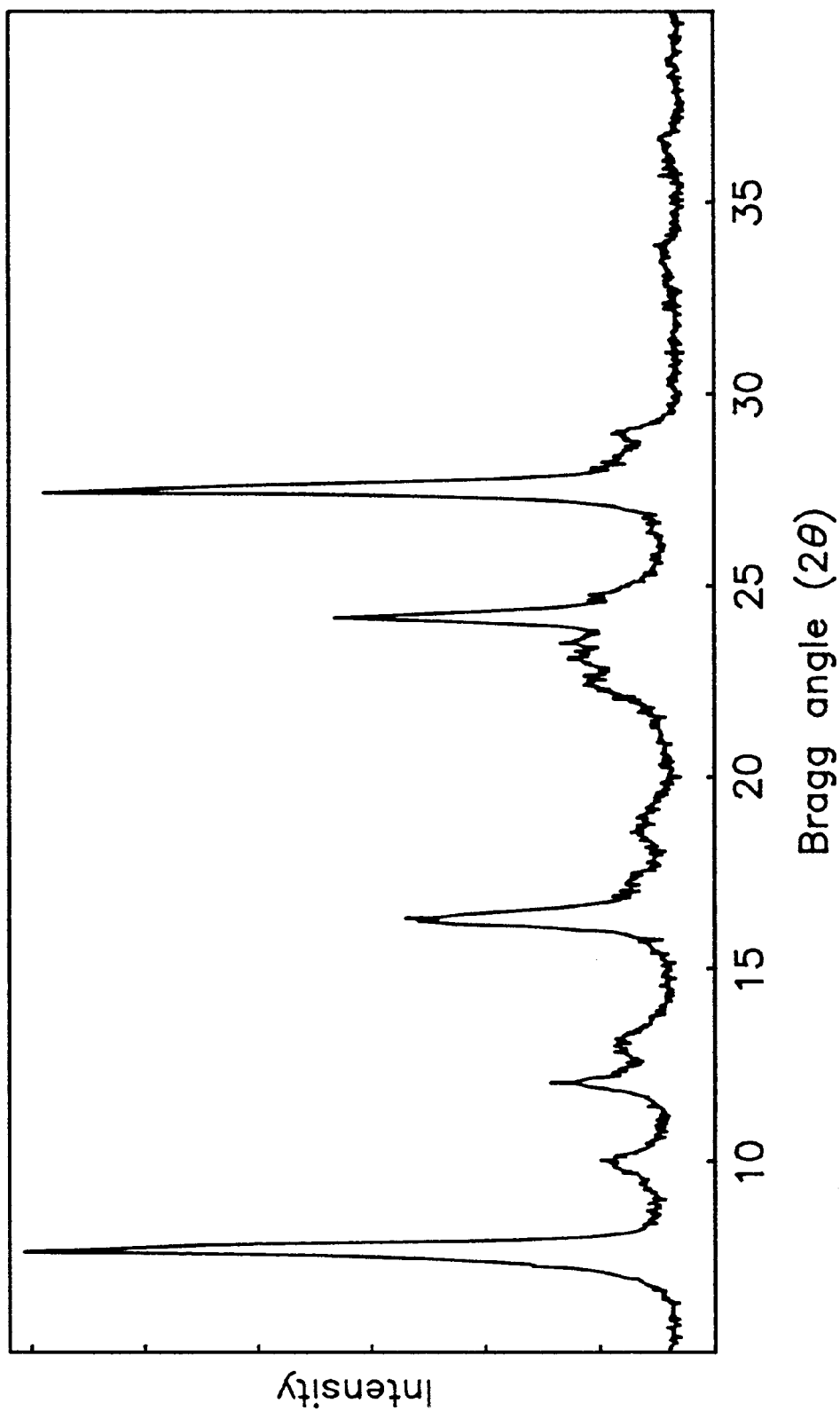
FIG. 6 is an X-ray diffraction spectrum of E-form dimer, which is prepared in Example 6.

An X-ray diffraction spectrum of the product was shown in FIG. 6. The result of FD-MS analysis was shown in FIG. 11. Further, the results of elemental analysis were shown in Table 8.

TABLE 8

|  | C | H | N | Cl | Ga |
|---|---|---|---|---|---|
| Calculated % | 65.12 | 2.73 | 18.98 | — | 11.81 |
| Found % | 66.60 | 2.87 | 18.50 | — | 10.60 |

The above described results show that the product is $\mu$-oxo-gallium Pc dimer, and the X-ray diffraction spectrum indicates that the $\mu$-oxo-gallium Pc dimer is E-form dimer which shows diffraction peaks at a Bragg angle (2 θ±0.2°) of 7.7°, 16.3°, 24.2°, and 27.6°.

Example 7
Synthesis of F-form dimer 1.0 g of Amorphous-form dimer prepared in Example 2 was added to 30 ml of ethylene glycol monomethyl ether, and the mixture was refluxed with stirring (simply dispersed) for 13 hours. The mixture was allowed to cool, and filtered. The resulting wet cake was washed with methanol and dried under vacuum to obtain 0.88 g of blue solid $\mu$-oxo-gallium Pc dimer.

Figure 7:
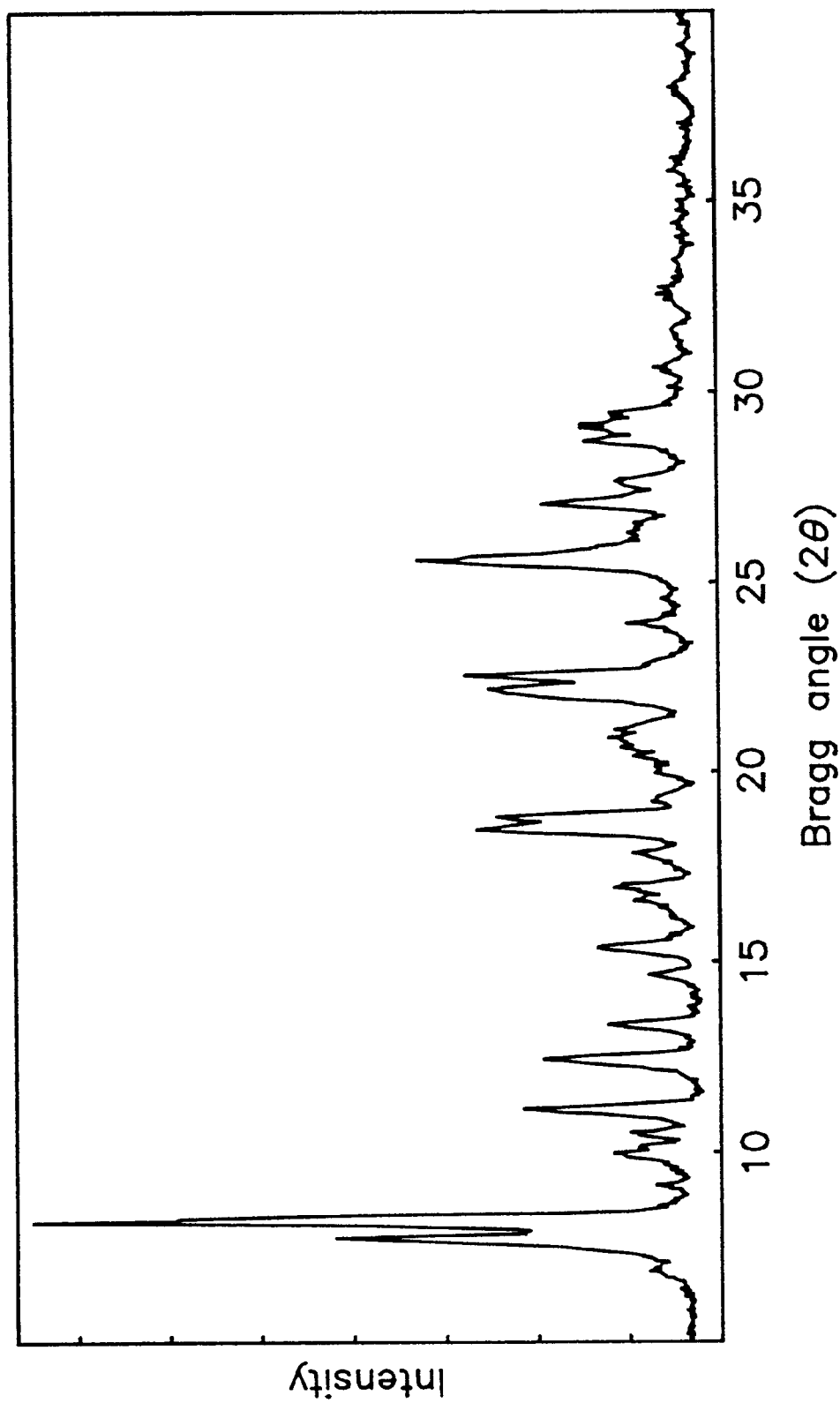
FIG. 7 is an X-ray diffraction spectrum of F-form dimer, which is prepared in Example 7.

An X-ray diffraction spectrum of the product was shown in FIG. 7. The result of FD-MS analysis was shown in FIG. 11. Further, the results of elemental analysis were shown in Table 9.

TABLE 9

| | C | H | N | Cl | Ga |
|---|---|---|---|---|---|
| Calculated % | 65.12 | 2.73 | 18.98 | — | 11.81 |
| Found % | 67.07 | 3.29 | 17.76 | — | 10.35 |

The above described results show that the product is μ-oxo-gallium Pc dimer, and the X-ray diffraction spectrum indicates that the μ-oxo-gallium Pc dimer is F-form dimer which shows diffraction peaks at a Bragg angle (2 θ±0.2°) of 7.7°, 8.2°, 11.1°, 12.4°, 13.3°, 15.3°, 18.5°, 18.8°, 22.1°, 22.5°, 25.5°, 27.0°, 28.7°, 29.1°, and 29.4°.

Example 8
Synthesis of G-form dimer 1.0 g of Amorphous-form dimer prepared in Example 2 was added to 30 ml of DMF, and the mixture was stirred (simply dispersed) at room temperature for 10 to 12 hours. The mixture was allowed to cool, and filtered. The resulting wet cake was washed with methanol and dried under vacuum to obtain 0.84 g of blue solid μ-oxo-gallium Pc dimer.

Figure 8:
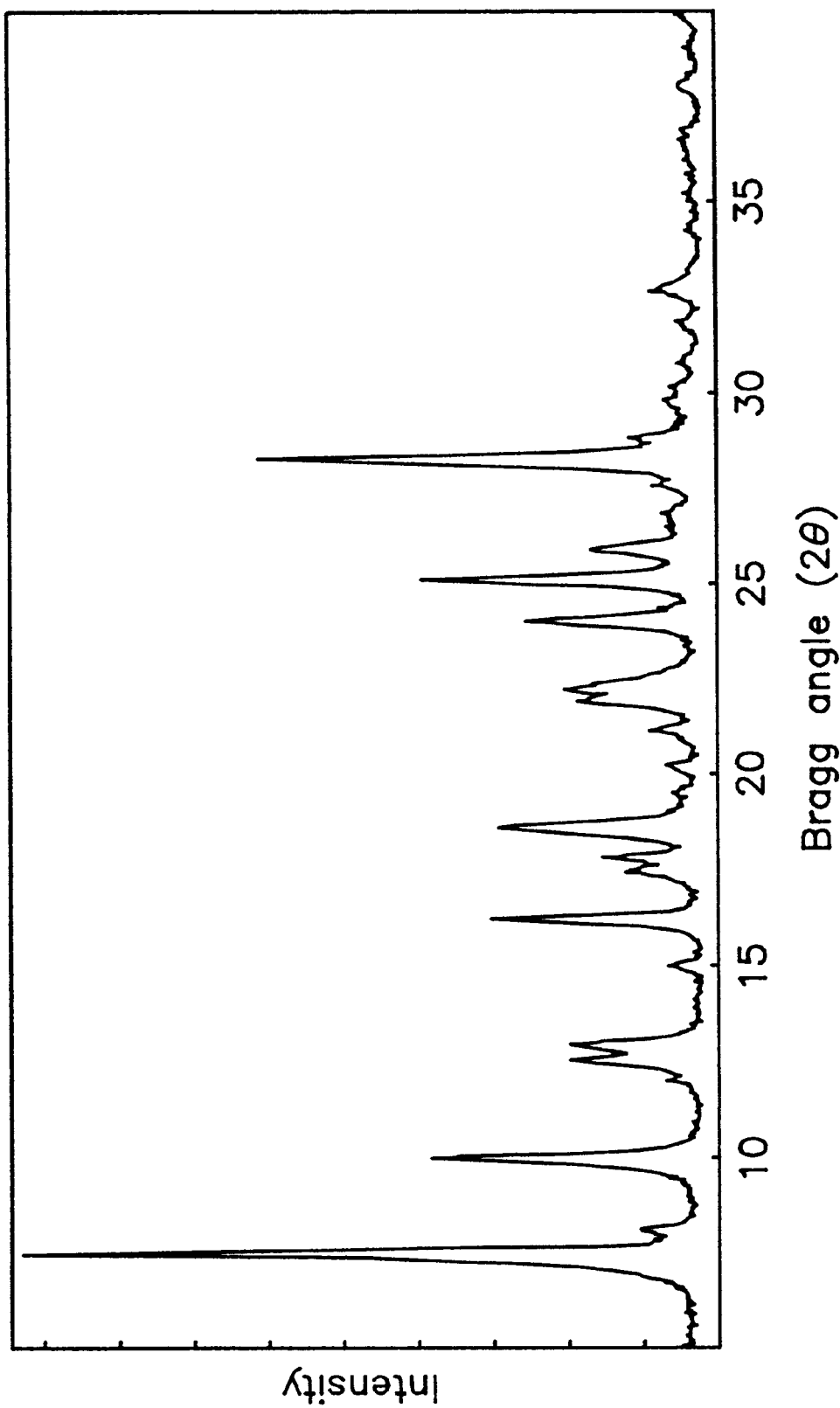
FIG. 8 is an X-ray diffraction spectrum of G-form dimer, which is prepared in Example 8.

An X-ray diffraction spectrum of the product was shown in FIG. 8. The result of FD-MS analysis was shown in FIG. 11. Further, the results of elemental analysis were shown in Table 10.

TABLE 10

| | C | H | N | Cl | Ga |
|---|---|---|---|---|---|
| Calculated % | 65.12 | 2.73 | 18.98 | — | 11.81 |
| Found % | 63.76 | 2.85 | 18.65 | — | 10.07 |

The above described results show that the product is μ-oxo-gallium Pc dimer, and the X-ray diffraction spectrum indicates that the μ-oxo-gallium Pc dimer is G-form dimer which shows diffraction peaks at a Bragg angle (2 θ±0.2°) of 7.4°, 9.9°, 12.5°, 12.9°, 16.1°, 18.5°, 21.9°, 22.2°, 24.0°, 25.1°, 25.8°, and 28.2°.

Example 9
Synthesis of H-form dimer 1.0 g of Amorphous-form dimer prepared in Example 2 was added to 30 ml of cyclohexanone, and the mixture was stirred (simply dispersed) at room temperature for 8 hours. The mixture was allowed to cool, and filtered. The resulting wet cake was washed with methanol and dried under vacuum to obtain 0.97 g of blue solid μ-oxo-gallium Pc dimer.

Figure 9:
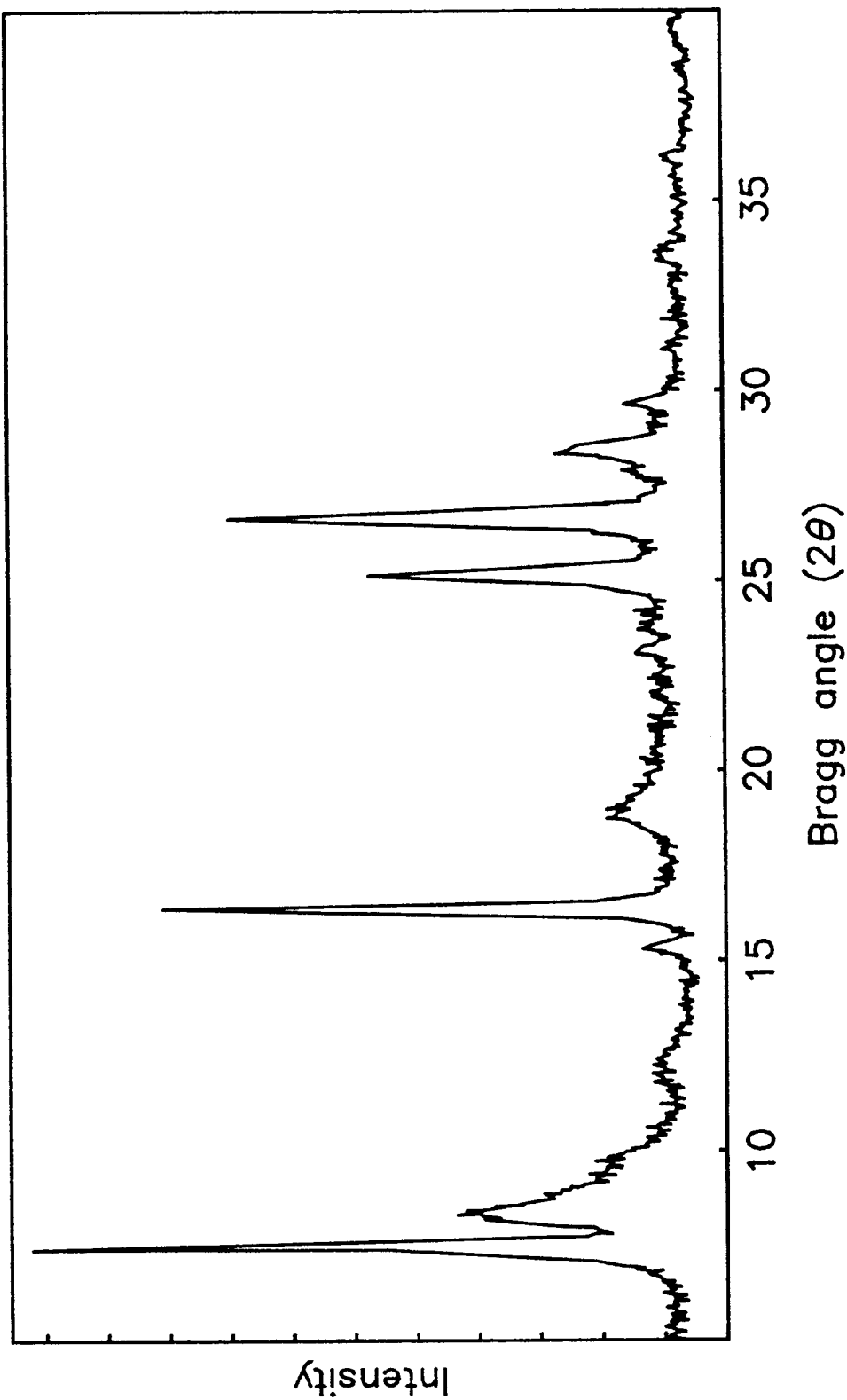
FIG. 9 is an X-ray diffraction spectrum of H-form dimer, which is prepared in Example 9.

An X-ray diffraction spectrum of the product was shown in FIG. 9. The result of FD-MS analysis was shown in FIG. 11. Further, the results of elemental analysis were shown in Table 11.

TABLE 11

| | C | H | N | Cl | Ga |
|---|---|---|---|---|---|
| Calculated % | 65.12 | 2.73 | 18.98 | — | 11.81 |
| Found % | 64.56 | 3.20 | 17.95 | — | 10.39 |

The above described results show that the product is μ-oxo-gallium Pc dimer, and the X-ray diffraction spectrum indicates that the μ-oxo-gallium Pc dimer is H-form dimer which shows diffraction peaks at a Bragg angle (2 θ±0.2°) of 7.6°, 16.4°, 25.1°, and 26.6°.

Example 10
Synthesis of I-form dimer 1.0 g of Amorphous-form dimer prepared in Example 2 was added to 30 ml of 1-chloronaphthalene, and the mixture was refluxed with stirring (simply dispersed) for 10 to 15 hours. The mixture was allowed to cool, and filtered. The resulting wet cake was washed with methanol and dried under vacuum to obtain 0.86 g of blue solid μ-oxo-gallium Pc dimer.

Figure 10:
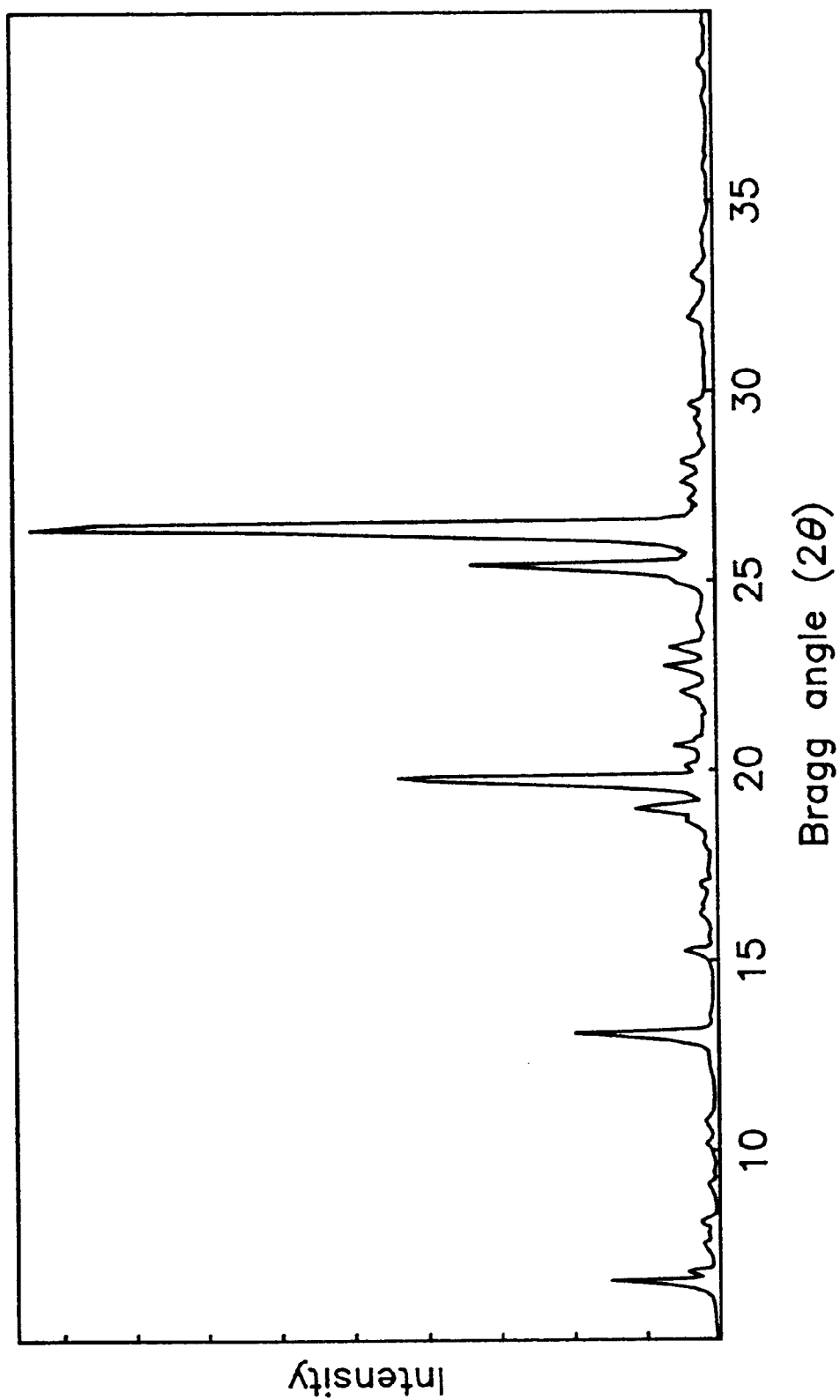
FIG. 10 is an X-ray diffraction spectrum of I-form dimer, which is prepared in Example 10.

An X-ray diffraction spectrum of the product was shown in FIG. 10. The result of FD-MS analysis was shown in FIG. 11. Further, the results of elemental analysis were shown in Table 12.

TABLE 12

| | C | H | N | Cl | Ga |
|---|---|---|---|---|---|
| Calculated % | 65.12 | 2.73 | 18.98 | — | 11.81 |
| Found % | 64.68 | 2.71 | 18.58 | — | 10.80 |

The above described results show that the product is μ-oxo-gallium Pc dimer, and the X-ray diffraction spectrum indicates that the μ-oxo-gallium Pc dimer is I-form dimer which shows diffraction peaks at a Bragg angle (2 θ±0.2°) of 6.5°, 13.1°, 19.0°, 19.7°, 25.4°, and 26.3°.

The experimental process described in Examples 1 to 10 was summarized in the following Table 13.

TABLE 13

| Ex. No. | Original polymor.[1] | Solvent | Condition Temp(°C.) | Time | Procedure | Resultant polymor. |
|---|---|---|---|---|---|---|
| 1 | Cl-GaPc[2] | — | — | — | — | A |
| 2 | A | — | ca. room | 2–3 d | dry mill | Amorph. |
| 3 | Amorph. | Ethylene glycol | room | 16 h | wet mill | B |
| 4 | Amorph. | Cyclohexanone | reflux | 30–40 h | simply disp. | C |
| 5 | Amorph. | Amyl alcohol | reflux | 10 h | simply disp. | D |
| 6 | Amorph. | Diglyme | reflux | 24 h | simply disp. | E |
| 7 | Amorph. | Methyl cellosolve | reflux | 13 h | simply disp. | F |
| 8 | Amorph. | DMF | room | 10–12 h | simply disp. | G |
| 9 | Amorph. | Cyclohexanone | room | 8 h | simply disp. | H |
| 10 | Amorph. | 1-Chloro-naphthalene | reflux | 12–15 h | simply disp. | I |

[1]Polymorph of μ-oxo-gallium Pc dimer.
[2]Chlorogallium Pc

Examples 11 to 13

The present examples illustrate a function separated-form electrophotographic photoreceptor to which the μ-oxo-gallium Pc dimer having a novel polymorph of the present invention was applied. The μ-oxo-gallium Pc dimers prepared in Examples were employed as a charge generator (CG material).

Example 11

0.2 g of A-form dimer, 0.2 g of a polyvinyl butyral resin ("ELEX BH-3" available from Sekisui Kagaku K. K.), 59.6 g of cyclohexanone, and 50 g of glass beads having a diameter of 3 mmϕ were charged in a wide-mouthed bottle. The mixture was shook for 1 hour using a dispersing apparatus (paint shaker), and applied on an aluminum plate by a bar coater. The coating was dried in air to form a charge generating layer having a thickness of 0.5 μm.

1.5 g of 1,1-bis(p-diethylaminophenyl)-4,4'-diphenyl-1,3-butadiene ("T-405" available from Takasa Koryo K. K.), 1.5 g of a polycarbonate resin ("PANLIGHT L-1250" available from Teijin K. K.), and 57.0 g of methylene chloride were charged in a wide-mouthed bottle. The mixture was homogenized by using supersonic wave, and applied on the charge generating layer by a bar coater. The coating was dried in air to form a charge transporting layer having a thickness of 20 μm. Thereby, a bi-layered electrophotographic photoreceptor was prepared.

Example 12

An electrophotographic photoreceptor was prepared according to substantially the same manner as described in Example 11, except that 4-benzylamino-2-methylbenzaldehyde-1,1'-diphenylhydorazone ("CTC-191" manufactured by Takasa Koryo K.K.) was used as a CT material instead of 1,1-bis(diethylaminophenyl)-4,4'-diphenyl-1,3-butadiene.

Example 13

An electrophotographic photoreceptor was prepared according to substantially the same manner as described in Example 11, except that the Amorphous-form dimer was used as a CG material instead of A-form dimer.

Examples 14 to 30

Electrophotographic photoreceptors of the present invention were prepared according to substantially the same manner as described in Example 11, except that the materials tabulated in the following Table 14 were used as a CG material and a CT material.

Comparative Example 1

An electrophotographic photoreceptor was prepared according to substantially the same manner as described in Example 12, except that Y-form titanyl Pc which was prepared according to the procedure described in Japanese Patent Kokoku Publication No. 35064/1991 (Konica K. K.) was used as a CG material instead of A-form dimer.

Comparative Example 2

An electrophotographic photoreceptor was prepared according to substantially the same manner as described in Example 12, except that X-form metal-free Pc which was prepared according to the procedure described in Japanese Patent Kokoku Publication No. 78872/1991 was used as a CG material instead of A-form dimer.

Comparative Example 3

An electrophotographic photoreceptor was prepared according to substantially the same manner as described in Example 12, except that chlorogallium Pc which was prepared in Synthesis Example 1 was used as a CG material instead of A-form dimer.

Evaluation of Property of the Photoreceptors

Electrophotographic property of the photoconductors prepared in Examples 11 to 30 and Comparative Examples 1 to 3 were measured. A static electricity charging tester "EPA-8200" manufactured by Kawaguchi Denki K. K. was used as the measuring apparatus.

The sample was corona charged at−8.0 kV in STAT 3 mode by first. It was then left in the dark for 20 seconds, and irradiated by 5.0 lux white light for 10.0 seconds. The charged potential (Vo), the sensitivity half-value irradiation amount ($E_{1/2}$), the residual potential (Vr) were recorded. The results were shown in Table 14.

TABLE 14

| Ex. No. | CG material (Polymorph) | Solvent[1] | CT material | $V_o$ (V) | $E_{1/2}$ (Lux · sec) | Vr (V) |
|---|---|---|---|---|---|---|
| 11 | A | — | T-405 | −196 | 4.97 | −4.3 |
| 12 | A | — | CTC-191 | −259 | 6.40 | −6.7 |
| 13 | Amorphous | — | T-405 | −120 | 2.04 | −4.7 |
| 14 | Amorphous | — | CTC-191 | −160 | 4.09 | −1.3 |
| 15 | B | Ethylene glycol | T-405 | −175 | 4.06 | −5.0 |
| 16 | B | Ethylene glycol | CTC-191 | −237 | — | −8.3 |
| 17 | C | Cyclohexanone | T-405 | −189 | 7.46 | −5.3 |
| 18 | C | Cyclohexanone | CTC-191 | −239 | 18.55 | −38.0 |
| 19 | D | Amyl alcohol | T-405 | −139 | 1.94 | −5.3 |
| 20 | D | Amyl alcohol | CTC-191 | −194 | 6.05 | −4.0 |
| 21 | E | Diglyme | T-405 | −234 | 5.89 | −4.7 |
| 22 | E | Diglyme | CTC-191 | −248 | 9.54 | −12.3 |
| 23 | F | Methyl cellosolve | T-405 | −195 | 5.47 | −3.7 |
| 24 | F | Methyl cellosolve | CTC-191 | −234 | — | −12.7 |
| 25 | G | DMF | T-405 | −132 | 0.82 | −5.7 |
| 26 | G | DMF | CTC-191 | −218 | 1.51 | −1.3 |
| 27 | H | Cyclohexanone | T-405 | −185 | 3.56 | −5.0 |
| 28 | H | Cyclohexanone | CTC-191 | −232 | 8.42 | −5.0 |
| 29 | I | 1-Chloronaphthalene | T-405 | −137 | 2.18 | −5.0 |
| 30 | I | 1-Chloronaphthalene | CTC-191 | −184 | 3.13 | 0.0 |
| C1 | Ti Pc[2] | — | CTC-191 | −173 | 1.09 | −2.0 |
| C2 | H2-Pc[3] | — | T-405 | −195 | 4.09 | −2.0 |

TABLE 14-continued

| Ex. No. | CG material (Polymorph) | Solvent[1] | CT material | $V_o$ (V) | $E_{1/2}$ (Lux·sec) | Vr (V) |
|---|---|---|---|---|---|---|
| C3 | Cl-GaPc[4] | — | CTC-191 | −240 | 8.29 | −7.7 |

[1]Solvent which is used for the development of the corresponding polymorph.
[2]Titanyl Pc
[3]X-form nonmetallo-Pc
[4]Chlorogallium Pc
T-405: 1,1-bis(p-diethylaminophenyl)-4,4'-diphenyl-1,3-butadiene available from Takasa Koryo K.K.
CTC-191: 4-benzylamino-2-methylbenzaldehyde-1,1'-diphenylhydorazone manufactured by Takasa Koryo K.K.
—: impossible to measure

Example 31

Four bi-layered electrophotographic photoreceptors were prepared according to substantially the same manner as described in Example 11, except that G-form dimer of Example 26, I-form dimer of Example 30, Y-form titanyl Pc of Comparative Example 1, and X-form metal-free Pc of Comparative Example 2, were used as a CG material respectively.

The resulting electrophotographic photoreceptors were charged, according to substantially the same manner as described in the column of "Evaluation of Property of the Photoreceptors", except that a monochlomic light having a wavelength of 450 nm through a band path interference filter, was irradiated. Energy for irradiation was controlled to 1.00 µW.

The initial charged potential ($V_{max}$ [V]), and the sensitivity half-value irradiation amount ($E_{1/2}$ [µJ/cm$^2$]) were measured.

Figure 15:
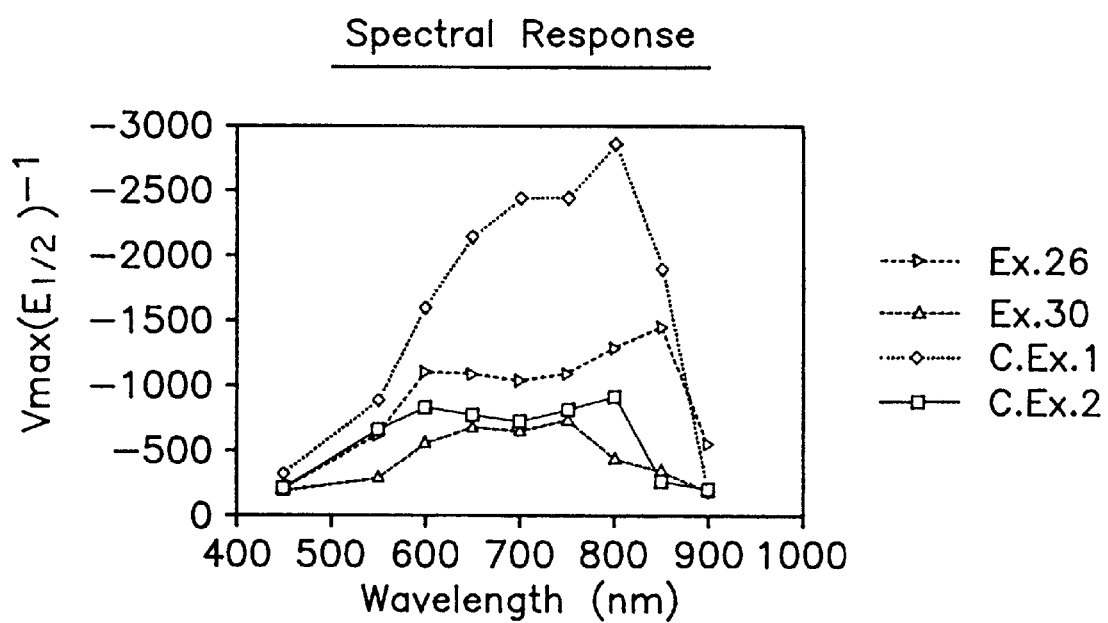
FIG. 15 is a plot of results obtained by a spectral response analysis of photoreceptors prepared in Examples 26 and 30, and Comparative Examples 1 and 2.

A wavelength of the monochromic light was controlled at an interval of 50 nm between from 450 to 900 nm, and the above described measurement was repeated. The resulting spectroscopic sensitivities of the electrophotographic photoreceptors were plotted. The results were shown in FIG. 15.

Three bi-layered electrophotographic photoreceptors were prepared according to substantially the same manner as described in Example 11, except that G-form dimer of Example 26, Y-form titanyl Pc of Comparative Example 1, and X-form metal-free Pc of Comparative Example 2, were used as a CG material respectively.

Figure 16:
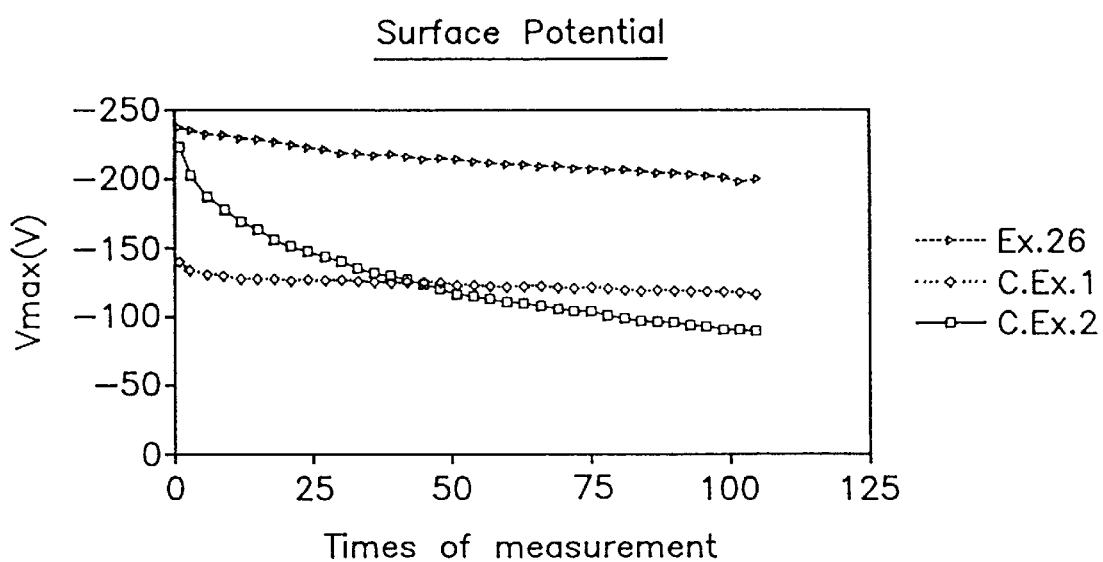
FIG. 16 is a plot of results obtained by a surface potential durability analysis of photoreceptors which is prepared in Example 26, and Comparative Examples 1 and 2.
Figure 17:
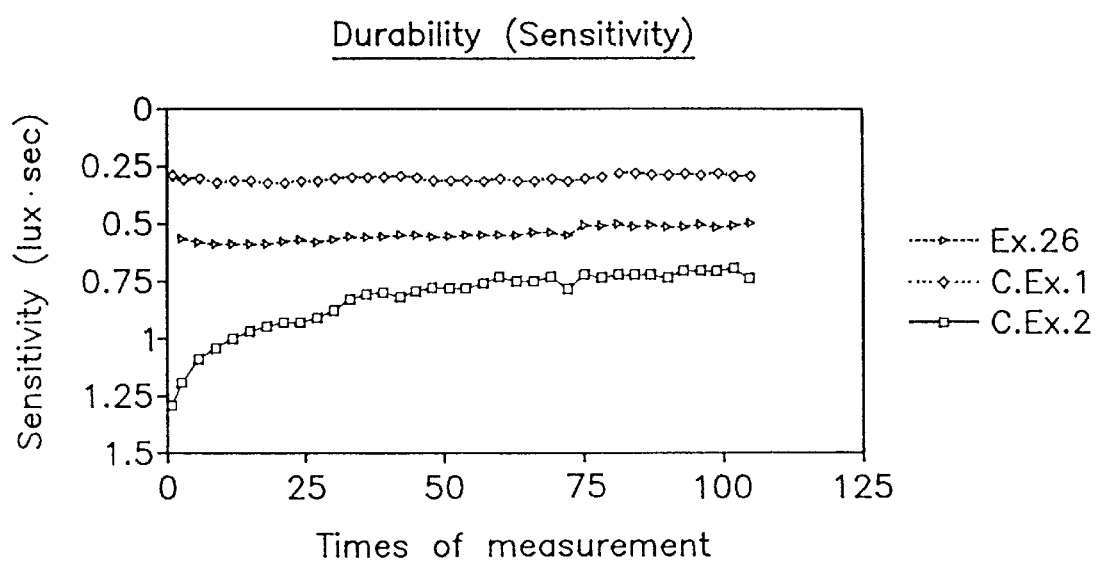
FIG. 17 is a plot of results obtained by a sensitivity durability analysis of photoreceptors which is prepared in Example 26, and Comparative Examples 1 and 2.

A static electricity charging tester "EPA-8200" was set to the mode for measuring durability. The electrophotographic photoreceptors were then charged, according to substantially the same manner as described in the column of "Evaluation of Property of the Photoreceptors". The charging and discharging were repeated 100 times, on the mode for measuring durability of the static electricity charging tester. Change of charged potential (Vo), and sensitivity half-value irradiation amount ($E_{1/2}$) during the repetition of charging and discharging, was measured, with respect to each electrophotographic photoreceptors. The results were shown in FIG. 16 and 17.

The photoreceptors which employ the D-, E-, F-, G-, and I-form dimer show particularly high photoconductivity, and those which employ the G-, and I-form dimer also show good reproductivity. On the other hand, the Comparative Examples which employ the conventional CG materials such as Y-form titanyl Pc and X-form metal-free Pc, show poor photosensitive properties.

The µ-oxo-gallium Pc dimer having novel polymorph of the present invention achieves high sensitivity half-value irradiation amount by comparison with X-form metal-free Pc, and achieves excellent durability by comparison with Y-form titanyl Pc. As a result, µ-oxo-gallium Pc dimer having novel invention of the present invention is useful as a photoconductive materials for use in the related art of optoelectronics.

The inventors are now further investigating a binder and a CT material which well match with the µ-oxo-gallium Pc dimer of the present invention.

What is claimed is:

1. An electrophotographic photoreceptor which includes an µ-oxo-gallium phthalocyanlne dimer as a charge generator, wherein said µ-oxo-gallium phthalocyanine dimer is selected from the group consisting of:

a µ-oxo-gallium phthalocyanine dimer having a novel polymorph which shows diffraction peaks at a Bragg angle (2 θ±0.2°) of 6.8°, 12.9°, 19.0°, 19.6°, 20.3°, 25.5°, 25.9°, and 26.9° in an X-ray diffraction spectrum by CuK α-ray (A-form), a µ-oxo-gallium phthalocyanine dimer having a novel polymorph which shows diffraction peaks at a Bragg angle (2 θ±0.2°) of 7.1° in an X-ray diffraction spectrum by CuK α-ray, and shows no clear peak other than 7.1° (Amorphous-form), a µ-oxo-gallium phthalocyanine dimer having a novel polymorph which shows diffraction peaks at a Bragg angle (2 θ±0.2°) of 8.1°, 8.7°, 9.2°, 10.4°, 15.1°, 15.9°, 17.0°, 21.7°, 22.3°, 22.9°, 24.3°, 28.8°, 29.4°, and 30.5° in an X-ray diffraction spectrum by CuK α-ray (B-form), a µ-oxo-gallium phthalocyanine dimer having a novel polymorph which shows diffraction peaks at a Bragg angle (2 θ±0.2°) of 7.7°, 16.0°, 24.9°, and 26.3° in an X-ray diffraction spectrum by CuK α-ray (C-form), a µ-oxo-gallium phthalocyanine dimer having a novel polymorph which shows diffraction peaks at a Bragg angle (2 θ±0.2°) of 7.3°, 8.8°, 22.6°, 25.5°, and 27.8° in an X-ray diffraction spectrum by CuK α-ray (D-form), a µ-oxo-gallium phthalocyanine dimer having a novel polymorph which shows diffraction peaks at a Bragg angle (2 θ±0.2°) of 7.7°, 16.3°, 24.2°, and 27.6° in an X-ray diffraction spectrum by CuK α-ray (E-form), a µ-oxo-gallium phthalocyanine dimer having a novel polymorph which shows diffraction peaks at a Bragg angle (2 θ±0.2°) of 7.7°, 8.2°, 11.1°, 12.4°, 13.3°, 15.3°, 18.5°, 18.8°, 22.1°, 22.5°, 25.5°, 27.0°, 28.7°, 29.1°, and 29.4° in an X-ray diffraction spectrum by CuK α-ray (F-form), a µ-oxo-gallium phthalocyanine dimer having a novel polymorph which shows diffraction peaks at a Bragg angle (2 θ±0.2°) of 7.4°, 9.9°, 12.5°, 12.9°, 16.1°, 18.5°, 21.9°, 22.2°, 24.0°, 25.1°, 25.8°, and 28.2° in an X-ray diffraction spectrum by CuK α-ray (G-form), a µ-oxo-gailium phthalocyanine dimer having a novel polymorph which shows diffraction peaks at a Bragg angle (2 θ±0.2°) of 7.6°, 16.4°, 25.1°, and 26.6° in an X-ray diffraction spectrum by CuK α-ray (H-form), and a µ-oxo-gailium phthalocyanine dimer having a novel polymorph which shows diffraction peaks at a Bragg angle (2 θ±0.2°) of 6.5°, 13.1°, 19.0°, 19.7°, 25.4°, and 26.3° in an x-ray diffraction spectrum by CuK α-ray (I-form).

2. The electrophotographic photoreceptor according to claim 1, wherein said µ-oxo-gallium phthalocyanine dimer is a µ-oxo-gallium phthalocyanine dimer having a novel polymorph which shows diffraction peaks at a Bragg angle (2 θ±0.2°) of 6.8°, 12.9°, 19.0°, 19.6°, 20.3°, 25.5°, 25.9°, and 26.9° in an X-ray diffraction spectrum by CuK α-ray (A-form).

3. The electrophotographic photoreceptor according to claim 1, wherein said µ-oxo-gallium phthalocyanine dimer is a µ-oxo-gallium phthalocyanine dimer having a novel polymorph which shows diffraction peaks at a Bragg angle (2 θ±0.2°) of 7.1° in an X-ray diffraction spectrum by CuK α-ray, and shows no clear peak other than 7.1° (Amorphous-form).

4. The electrophotographic photoreceptor according to claim 1, wherein said µ-oxo-gallium phthalocyanine dimer is a µ-oxo-gallium phthalocyanine dimer having a novel polymorph which shows diffraction peaks at a Bragg angle (2 θ±0.2°) of 8.1°, 8.7°, 9.2°, 10.4°, 15.1°, 15.9°, 17.0°, 21.7°, 22.3°, 22.9°, 24.3°, 28.8°, 29.4°, and 30.5° in an X-ray diffraction spectrum by CuK α-ray (B-form).

5. The electrophotographic photoreceptor according to claim 1, wherein said µ-oxo-gallium phthalocyanine dimer is a µ-oxo-gallium phthalocyanine dimer having a novel polymorph which shows diffraction peaks at a Bragg angle (2 θ±0.2°) of 7.7°, 16.0°, 24.9°, and 26.3° in an X-ray diffraction spectrum by CuK α-ray (C-form).

6. The electrophotographic photoreceptor according to claim 1, wherein said µ-oxo-gallium phthalocyanine dimer is a µ-oxo-gallium phthalocyanine dimer having a novel polymorph which shows diffraction peaks at a Bragg angle (2 θ±0.2°) of 7.3°, 8.8°, 22.6°, 25.5°, and 27.8° in an X-ray diffraction spectrum by CuK α-ray (D-form).

7. The electrophotographic photoreceptor according to claim 1, wherein said µ-oxo-gallium phthalocyanine dimer is a µ-oxo-gallium phthalocyanine dimer having a novel polymorph which shows diffraction peaks at a Bragg angle (2 θ±0.2°) of 7.7°, 16.3°, 24.2°, and 27.6° in an X-ray diffraction spectrum by CuK α-ray (E-form).

8. The electrophotographic photoreceptor according to claim 1, wherein said µ-oxo-gallium phthalocyanine dimer is a µ-oxo-gallium phthalocyanine dimer having a novel polymorph which shows diffraction peaks at a Bragg angle (2 θ±0.2°) of 7.7°, 8.2°, 11.1°, 12.4°, 13.3°, 15.3°, 18.5°, 18.8°, 22.1°, 22.5°, 25.5°, 27.0°, 28.7°, 29.1°, and 29.4° in an X-ray diffraction spectrum by CuK α-ray (F-form).

9. The electrophotographic photoreceptor according to claim 1, wherein said µ-oxo-gallium phthalocyanine dimer is a µ-oxo-gallium phthalocyanine dimer having a novel polymorph which shows diffraction peaks at a Bragg angle (2 θ±0.2°) of 7.4°, 9.9°, 12.5°, 12.9°, 16.1°, 18.5°, 21.9°, 22.2°, 24.0°, 25.1°, 25.8°, and 28.2° in an X-ray diffraction spectrum by CuK (x-ray (G-form).

10. The electrophotographic photoreceptor according to claim 1, wherein said µ-oxo-gallium phthalocyanine dimer is a µ-oxo-gallium phthalocyanine dimer having a novel polymorph which shows diffraction peaks at a Bragg angle (2 θ±0.2°) of 7.6°, 16.4°, 25.1°, and 26.6° in an X-ray diffraction spectrum by CuK α-ray (H-form).

11. The electrophotographic photoreceptor according to claim 1, wherein said µ-oxo-gallium phthalocyanine dimer is a µ-oxo-gallium phthalocyanine dimer having a novel polymorph which shows diffraction peaks at a Bragg angle (2 θ±0.2°) of 6.5°, 13.1°, 19.0°, 19.7°, 25.4°, and 26.3° in an x-ray diffraction spectrum by CuK α-ray (I-form).

12. An electrophotographic photoreceptor which has a conductive substrate, and a photoconductive layer on the conductive substrate, wherein the photoconductive layer includes a µ-oxo-gallium phthalocyanine dimer as a charge generator, wherein said µ-oxo-gallium phthalocyanine dimer is selected from the group consisting of:

a µ-oxo-gallium phthalocyanine dimer having a novel polymorph which shows diffraction peaks at a Bragg angle (2 θ±0.2°) of 6.8°, 12.9°, 19.0°, 19.6°, 20.3°, 25.5°, 25.9°, and 26.9° in an X-ray diffraction spectrum by CuK α-ray (A-form), a µ-oxo-gallium phthalocyanine dimer having a novel polymorph which shows diffraction peaks at a Bragg angle (2 θ±0.2°) of 7.1° in an X-ray diffraction spectrum by CuK α-ray, and shows no clear peak other than 7.1° (Amorphous-form), a µ-oxo-gallium phthalocyanine dimer having a novel polymorph which shows diffraction peaks at a Bragg angle (2 θ±0.2°) of 8.1°, 8.7°, 9.2°, 10.4°, 15.1°, 15.9°, 17.0°, 21.7°, 22.3°, 22.9°, 24.3°, 28.8°, 29.4°, and 30.5° in an X-ray diffraction spectrum by CuK α-ray (B-form), a µ-oxo-gallium phthalocyanine dimer having a novel polymorph which shows diffraction peaks at a Bragg angle (2 θ±0.2°) of 7.7°, 16.0°, 24.9°, and 26.3° in an x-ray diffraction spectrum by CuK α-ray (C-form), a µ-oxo-gallium phthalocyanine dimer having a novel polymorph which shows diffraction peaks at a Bragg angle (2 θ±0.2°) of 7.3°, 8.8°, 22.6°, 25.5°, and 27.8° in an X-ray diffraction spectrum by CuK α-ray (D-form), a µ-oxo-gallium phthalocyanine dimer having a novel polymorph which shows diffraction peaks at a Bragg angle (2 θ±0.2°) of 7.7°, 16.3°, 24.2°, and 27.6° in an X-ray diffraction spectrum by CuK α-ray (E-form), a µ-oxo-gallium phthalocyanine dimer having a novel polymorph which shows diffraction peaks at a Bragg angle (2 θ±0.2°) of 7.7°, 8.2°, 11.1°, 12.4°, 13.3°, 15.3°, 18.5°, 18.8°, 22.1°, 22.5°, 25.5°, 27.0°, 28.7°, 29.1°, and 29.4° in an X-ray diffraction spectrum by CuK α-ray (F-form), a µ-oxo-gallium phthalocyanine dimer having a novel polymorph which shows diffraction peaks at a Bragg angle (2 θ±0.2°) of 7.4°, 9.9°, 12.5°, 12.9°, 16.1°, 18.5°, 21.9°, 22.2°, 24.0°, 25.1°, 25.8°, and 28.2° in an X-ray diffraction spectrum by CuK α-ray (G-form), a µ-oxo-gallium phthalocyanine dimer having a novel polymorph which shows diffraction peaks at a Bragg angle (2 θ±0.2°) of 7.6°, 16.4°, 25.1°, and 26.6° in an X-ray diffraction spectrum by CuK α-ray (H-form), and a µ-oxo-gallium phthalocyanine dimer having a novel polymorph which shows diffraction peaks at a Bragg angle (2 θ±0.2°) of 6.5°, 13.1°, 19.0°, 19.7°, 25.4°, and 26.3° in an x-ray diffraction spectrum by CuK α-ray (I-form).

13. The electrophotographic photoreceptor according to claim 12, wherein said µ-oxo-gallium phthalocyanine dimer is a µ-oxo-gallium phthalocyanine dimer having a novel polymorph which shows diffraction peaks at a Bragg angle (2 θ±0.2°) of 6.8°, 12.9°, 19.0°, 19.6°, 20.3°, 25.5°, 25.9°, and 26.9° in an X-ray diffraction spectrum by CuK α-ray (A-form).

14. The electrophotographic photoreceptor according to claim 12, wherein said µ-oxo-gallium phthalocyanine dimer is a µ-oxo-gallium phthalocyanine dimer having a novel polymorph which shows diffraction peaks at a Bragg angle (2 θ±0.2°) of 7.1° in an X-ray diffraction spectrum by CuK α-ray, and shows no clear peak other than 7.1° (Amorphous-form).

15. The electrophotographic photoreceptor according to claim 12, wherein said µ-oxo-gallium phthalocyanine dimer is a µ-oxo-gallium phthalocyanine dimer having a novel polymorph which shows diffraction peaks at a Bragg angle (2 θ±0.2°) of 8.1°, 8.7°, 9.2°, 10.4°, 15.1°, 15.9°, 17.0°, 21.7°, 22.3°, 22.9°, 24.3°, 28.8°, 29.4°, and 30.5° in an X-ray diffraction spectrum by CuK α-ray (B-form).

16. The electrophotographic photoreceptor according to claim 12, wherein said µ-oxo-gallium phthalocyanine dimer is a µ-oxo-gallium phthalocyanine dimer having a novel polymorph which shows diffraction peaks at a Bragg angle (2 θ±0.2°) of 7.7°, 16.0°, 24.9°, and 26.3° in an X-ray diffraction spectrum by CuK α-ray (C-form).

17. The electrophotographic photoreceptor according to claim 12, wherein said µ-oxo-gallium phthalocyanine dimer is a µ-oxo-gallium phthalocyanine dimer having a novel polymorph which shows diffraction peaks at a Bragg angle (2 θ±0.2°) of 7.3°, 8.8°, 22.6°, 25.5°, and 27.8° in an X-ray diffraction spectrum by CuK α-ray (D-form).

18. The electrophotographic photoreceptor according to claim 12, wherein said µ-oxo-gallium phthalocyanine dimer is a µ-oxo-gallium phthalocyanine dimer having a novel polymorph which shows diffraction peaks at a Bragg angle (2 θ±0.2°) of 7.7°, 16.3°, 24.2°, and 27.6° in an X-ray diffraction spectrum by CuK α-ray (E-form).

19. The electrophotographic photoreceptor according to claim 12, wherein said µ-oxo-gallium phthalocyanine dimer is a µ-oxo-gallium phthalocyanine dimer having a novel polymorph which shows diffraction peaks at a Bragg angle (2 θ±0.2°) of 7.7°, 8.2°, 11.1°, 12.4°, 13.3°, 15.3°, 18.5°, 18.8°, 22.1°, 22.5°, 25.5°, 27.0°, 28.7°, 29.1°, and 29.4° in an X-ray diffraction spectrum by CuK α-ray (F-form).

20. The electrophotographic photoreceptor according to claim 12, wherein said µ-oxo-gallium phthalocyanine dimer is a µ-oxo-gallium phthalocyanine dimer having a novel polymorph which shows diffraction peaks at a Bragg angle (2 θ±0.2°) of 7.4°, 9.9°, 12.5°, 12.9°, 16.1°, 18.5°, 21.9°, 22.2°, 24.0°, 25.1°, 25.8°, and 28.2° in an X-ray diffraction spectrum by CuK α-ray (G-form).

21. The electrophotographic photoreceptor according to claim 12, wherein said µ-oxo-gallium phthalocyanine dimer is a µ-oxo-gallium phthalocyanine dimer having a novel polymorph which shows diffraction peaks at a Bragg angle (2 θ±0.2°) of 7.6°, 16.4°, 25.1°, and 26.6° in an X-ray diffraction spectrum by CuK α-ray (H-form).

22. The electrophotographic photoreceptor according to claim 12, wherein said µ-oxo-gallium phthalocyanine dimer is a µ-oxo-gallium phthalocyanine dimer having a novel polymorph which shows diffraction peaks at a Bragg angle (2 θ±0.2°) of 6.5°, 13.1°, 19.0°, 19.7°, 25.4°, and 26.3° in an x-ray diffraction spectrum by CuK α-ray (I-form).

23. A function separated-form electrophotographic photoreceptor which has a conductive substrate, a charge generating layer on the conductive substrate, and a charge transporting layer on the charge generating layer, wherein the charge generating layer includes a µ-oxo-gallium phthalocyanine dimer as a charge generator, wherein said a µ-oxo-gallium phthalocyanine dimer is selected from the group consisting of:

a µ-oxo-gallium phthalocyanine dimer having a novel polymorph which shows diffraction peaks at a Bragg angle (2 θ±0.2°) of 6.8°, 12.9°, 19.0°, 19.6°, 20.3°, 25.5°, 25.9°, and 26.9° in an X-ray diffraction spectrum by CuK α-ray (A-form), a µ-oxo-gallium phthalocyanine dimer having a novel polymorph which shows diffraction peaks at a Bragg angle (2 θ±0.2°) of 7.1° in an X-ray diffraction spectrum by CuK α-ray, and shows no clear peak other than 7.1° (Amorphous-form), a µ-oxo-gallium phthalocyanine dimer having a novel polymorph which shows diffraction peaks at a Bragg angle (2 θ±0.2°) of 8.1°, 8.7°, 9.2°, 10.4°, 15.1°, 15.9°, 17.0°, 21.7°, 22.3°, 22.9°, 24.3°, 28.8°, 29.4°, and 30.5° in an X-ray diffraction spectrum by CuK α-ray (B-form), a µ-oxo-gallium phthalocyanine dimer having a novel polymorph which shows diffraction peaks at a Bragg angle (2 θ±0.2°) of 7.7°, 16.0°, 24.9°, and 26.3° in an X-ray diffraction spectrum by CuK α-ray (C-form), a µ-oxo-gallium phthalocyanine dimer having a novel polymorph which shows diffraction peaks at a Bragg angle (2 θ±0.2°) of 7.3°, 8.8°, 22.6°, 25.5°, and 27.8° in an X-ray diffraction spectrum by CuK α-ray (D-form), a µ-oxo-gallium phthalocyanine dimer having a novel polymorph which shows diffraction peaks at a Bragg angle (2 θ±0.2°) of 7.7°, 16.3°, 24.2°, and 27.6° in an X-ray diffraction spectrum by CuK α-ray (E-form), a µ-oxo-gallium phthalocyanine dimer having a novel polymorph which shows diffraction peaks at a Bragg angle (2 θ±0.2°) of 7.7°, 8.2°, 11.1°, 12.4°, 13.3°, 15.3°, 18.5°, 18.8°, 22.1°, 22.5°, 25.5°, 27.0°, 28.7°, 29.1°, and 29.4° in an X-ray diffraction spectrum by CuK α-ray (F-form), a µ-oxo-gallium phthalocyanine dimer having a novel polymorph which shows diffraction peaks at a Bragg angle (2 θ±0.2°) of 7.4°, 9.9°, 12.5°, 12.9°, 16.1°, 18.5°, 21.9°, 22.2°, 24.0°, 25.1°, 25.8°, and 28.2° in an X-ray diffraction spectrum by CuK α-ray (G-form), a µ-oxo-gallium phthalocyanine dimer having a novel polymorph which shows diffraction peaks at a Bragg angle (2 θ±0.2°) of 7.6°, 16.4°, 25.1°, and 26.6° in an X-ray diffraction spectrum by CuK α-ray (H-form), and a µ-oxo-gallium phthalocyanine dimer having a novel polymorph which shows diffraction peaks at a Bragg angle (2 θ±0.2°) of 6.5°, 13.1°, 19.0°, 19.7°, 25.4°, and 26.3° in an x-ray diffraction spectrum by CuK α-ray (I-form).

24. The function separated-form electrophotographic photoreceptor according to claim 23, wherein said µ-oxo-gallium phthalocyanine dimer is a µ-oxo-gallium phthalocyanine dimer having a novel polymorph which shows diffraction peaks at a Bragg angle (2 θ±0.2°) of 6.8°, 12.9°, 19.0°, 19.6°, 20.3°, 25.5°, 25.9°, and 26.9° in an X-ray diffraction spectrum by CuK α-ray (A-form).

25. The function separated-form electrophotographic photoreceptor according to claim 23, wherein said µ-oxogallium phthalocyanine dimer is a μ-oxo-gallium phthalocyanine dimer having a novel polymorph which shows diffraction peaks at a Bragg angle (2 θ±0.2°) of 7.1° in an X-ray diffraction spectrum by CuK α-ray, and shows no clear peak other than 7.1° (Amorphous-form).

26. The function separated-form electrophotographic photoreceptor according to claim 23, wherein said μ-oxo-gallium phthalocyanine dimer is a μ-oxo-gallium phthalocyanine dimer having a novel polymorph which shows diffraction peaks at a Bragg angle (2 θ±0.2°) of 8.1°, 8.7°, 9.2°, 10.4°, 15.1°, 15.9°, 17.0°, 21.7°, 22.3°, 22.9°, 24.3°, 28.8°, 29.4°, and 30.5° in an X-ray diffraction spectrum by CuK α-ray (B-form).

27. The function separated-form electrophotographic photoreceptor according to claim 23, wherein said μ-oxo-gallium phthalocyanine dimer is a μ-oxo-gallium phthalocyanine dimer having a novel polymorph which shows diffraction peaks at a Bragg angle (2 θ±0.2°) of 7.7°, 16.0°, 24.9°, and 26.3° in an X-ray diffraction spectrum by CuK α-ray (C-form).

28. The function separated-form electrophotographic photoreceptor according to claim 23, wherein said μ-oxo-gallium phthalocyanine dimer is a μ-oxo-gallium phthalocyanine dimer having a novel polymorph which shows diffraction peaks at a Bragg angle (2 θ±0.2°) of 7.3°, 8.8°, 22.6°, 25.5°, and 27.8° in an X-ray diffraction spectrum by CuK α-ray (D-form).

29. The function separated-form electrophotographic photoreceptor according to claim 23, wherein said μ-oxo-gallium phthalocyanine dimer is a μ-oxo-gallium phthalocyanine dimer having a novel polymorph which shows diffraction peaks at a Bragg angle (2 θ±0.2°) of 7.7°, 16.3°, 24.2°, and 27.6° in an X-ray diffraction spectrum by CuK α-ray (E-form).

30. The function separated-form electrophotographic photoreceptor according to claim 23, wherein said μ-oxo-gallium phthalocyanine dimer is a μ-oxo-gallium phthalocyanine dimer having a novel polymorph which shows diffraction peaks at a Bragg angle (2 θ±0.2°) of 7.7°, 8.2°, 11.1°, 12.4°, 13.3°, 15.3°, 18.5°, 18.8°, 22.1°, 22.5°, 25.5°, 27.0°, 28.7°, 29.1°, and 29.4° in an X-ray diffraction spectrum by CuK α-ray (F-form).

31. The function separated-form electrophotographic photoreceptor according to claim 23, wherein said μ-oxo-gallium phthalocyanine dimer is a μ-oxo-gallium phthalocyanine dimer having a novel polymorph which shows diffraction peaks at a Bragg angle (2 θ±0.2°) of 7.4°, 9.9°, 12.5°, 12.9°, 16.1°, 18.5°, 21.9°, 22.2°, 24.0°, 25.1°, 25.8°, and 28.2° in an X-ray diffraction spectrum by CuK α-ray (G-form).

32. The function separated-form electrophotographic photoreceptor according to claim 23, wherein said μ-oxo-gallium phthalocyanine dimer is a μ-oxo-gallium phthalocyanine dimer having a novel polymorph which shows diffraction peaks at a Bragg angle (2 θ±0.2°) of 7.6°, 16.4°, 25.1°, and 26.6° in an X-ray diffraction spectrum by CuK α-ray (H-form).

33. The function separated-form electrophotographic photoreceptor according to claim 23, wherein said μ-oxo-gallium phthalocyanine dimer is a μ-oxo-gallium phthalocyanine dimer having a novel polymorph which shows diffraction peaks at a Bragg angle (2 θ±0.2°) of 6.5°, 13.1°, 19.0°, 19.7°, 25.4°, and 26.3° in an x-ray diffraction spectrum by CuK α-ray (I-form).

\* \* \* \* \*